(12) United States Patent
Eastman

(10) Patent No.: US 11,068,957 B2
(45) Date of Patent: Jul. 20, 2021

(54) SYSTEM AND METHOD FOR PROVIDING RECOMMENDATIONS BASED ON TRAVEL PATH AND ACTIVITY DATA

(71) Applicant: Under Armour, Inc., Baltimore, MD (US)

(72) Inventor: Kyler Eastman, Austin, TX (US)

(73) Assignee: Under Armour, Inc., Baltimore, MD (US)

( * ) Notice: Subject to any disclaimer, the term of this patent is extended or adjusted under 35 U.S.C. 154(b) by 1212 days.

(21) Appl. No.: 15/147,607

(22) Filed: May 5, 2016

(65) Prior Publication Data

US 2017/0323368 A1  Nov. 9, 2017

(51) Int. Cl.
| | |
|---|---|
| *G06Q 30/06* | (2012.01) |
| *G06F 16/9535* | (2019.01) |
| *G06F 16/9537* | (2019.01) |
| *G06F 16/2457* | (2019.01) |
| *G09B 19/00* | (2006.01) |

(52) U.S. Cl.
CPC ... *G06Q 30/0631* (2013.01); *G06F 16/24575* (2019.01); *G06F 16/9535* (2019.01); *G06F 16/9537* (2019.01); *G09B 19/0092* (2013.01); *G09B 19/00* (2013.01)

(58) Field of Classification Search
CPC .......... G06F 16/24575; G06F 16/9535; G06F 16/9537; G06Q 30/06–0645; G06Q 30/08; G06Q 50/01; G09B 19/00; G09B 19/0092

See application file for complete search history.

(56) References Cited

U.S. PATENT DOCUMENTS

| | | | | |
|---|---|---|---|---|
| 5,673,691 | A * | 10/1997 | Abrams ................ | G06F 15/025 600/300 |
| 6,611,881 | B1 * | 8/2003 | Gottfurcht ........... | G06Q 20/105 710/18 |
| 7,984,006 | B2 * | 7/2011 | Price ..................... | G06Q 30/02 706/46 |
| 8,200,551 | B1 * | 6/2012 | Nemer ............... | G06Q 30/0639 705/26.9 |
| 8,229,458 | B2 * | 7/2012 | Busch ................ | G06Q 30/0261 455/456.1 |
| 8,620,617 | B2 * | 12/2013 | Yuen ...................... | G06F 11/00 702/160 |

(Continued)

OTHER PUBLICATIONS

A. H. Andrew, K. Eustice and A. Hickl, "Using location lifelogs to make meaning of food and physical activity behaviors," 2013 7th International Conference on Pervasive Computing Technologies for Healthcare and Workshops, Venice, Italy, 2013, pp. 408-411, doi: 10.4108/icst.pervasivehealth.2013.252134. (Year: 2013).*

*Primary Examiner* — Adam L Levine
(74) *Attorney, Agent, or Firm* — Maginot, Moore & Beck LLP

(57) ABSTRACT

A method is provided for making recommendations for a user of an activity tracking system. The method includes receiving activity data for the user over a period of days, the activity data collected by a geo-position device. The method further includes determining routine travel paths for the user based on the activity data, and then determining recommendations, the recommendations based at least in part on the routine travel paths of the user. The method also includes sending the recommendations to the user.

17 Claims, 11 Drawing Sheets

(56) References Cited

U.S. PATENT DOCUMENTS

| | | | |
|---|---|---|---|
| 8,956,290 B2* | 2/2015 | Gilley | G06Q 10/06 |
| | | | 600/301 |
| 9,836,672 B2 | 12/2017 | Eastman | |
| 9,990,585 B2* | 6/2018 | Ohwa | G06N 5/04 |
| 2014/0122494 A1 | 5/2014 | Thurston | |
| 2020/0327179 A1* | 10/2020 | Matsumoto | G01C 21/3608 |

* cited by examiner

|  | MONDAY PM #1 | MONDAY PM #2 | MONDAY PM #3 | MONDAY PM #4 |
|---|---|---|---|---|
| EDGE 1 (1,2) | 2 | 1 | 1 | 1 |
| EDGE 2 (2,3) | 1 | 1 | 1 | 1 |
| EDGE 3 (2,4) | — | — | — | — |
| EDGE 4 (3,5) | 1 | 1 | 1 | 1 |
| EDGE 5 (5,6) | — | 1 | 1 | 1 |
| EDGE 6 (4,5) | 2 | — | — | — |

*FIG. 5*

| | ID STRING | TYPE | LOCATION | CARDIO | WEIGHT | MUSCLE | RELAX |
|---|---|---|---|---|---|---|---|
| 922 | V1 | SPIN CLASS | E6 (4,5) | YES | YES | NO | NO |
| 924 | V2 | GYM | E3 (3,4)<br>E6 (4,5) | YES | YES | YES | YES |
| 926 | V3 | TRACK | E4 (3,5) | YES | YES | NO | YES |
| 928 | V4 | BOARDWALK | E1 (1,2)<br>E2 (2,3) | NO | YES | NO | YES |

FIG. 12

SYSTEM AND METHOD FOR PROVIDING RECOMMENDATIONS BASED ON TRAVEL PATH AND ACTIVITY DATA

FIELD

This document relates to the field of activity tracking systems, and particularly to making recommendations based on activity data.

BACKGROUND

Humans are increasingly using wireless tools to track fitness and movement. Runners, cyclists and other athletes commonly use electronic devices to track both fitness data and route data. For example, a runner may wear a heart rate sensor during a workout to monitor his or her heart rate. The runner may also carry a smartphone equipped with global positioning system (GPS) capabilities in order to track the route taken and distance travelled during the workout. However, use of the smartphone is not limited to workouts, as athletes and other active individuals often carry a smartphone with GPS capabilities any time they are away from their homes. Accordingly, the movements of active individuals with smartphones or similar devices may be logged both during workouts and during their routine daily activities.

Active individuals are often away from their homes. When these individuals are away from their homes it is not unusual for the individual to find himself or herself in a situation where a healthy lifestyle decision must be made within a relatively short timeframe. A primary example of this is the decision to purchase a meal or other food item when away from the home. All of these individuals have preferences about the type of food they like to eat. In addition, many of these individuals are health conscious and wish to purchase food based on certain dietary guidelines. For example, diabetic individuals may wish to avoid foods with a high glycemic load. Individuals with celiac disease may need to avoid gluten in their diets. Individuals interested in general wellness or health and fitness may be interested in finding generally healthy foods or organic food choices. All of these individuals with various food preferences and dietary guidelines may be interested in obtaining food at times when they are far away from restaurants the individual knows to be capable of providing foods that meet their dietary guidelines.

In view of the foregoing, it would be advantageous to provide a system and method for providing recommendations, such as food purchase recommendations, to individuals based on certain preferences such as dietary preferences, dietary restraints, healthy living choices, lifestyle preferences, or other user-specific guidelines. It also would be advantageous if such recommendations were made such that the individual could quickly and conveniently follow such recommendation with minimal disruption to the user, such as conveniently obtaining a food item from a food provider. It would also be advantageous if relatively little input was required from the individual in order to follow the recommendations.

SUMMARY

In accordance with at least one exemplary embodiment of the disclosure, there is provided a method for making recommendations for a user of an activity tracking system. The method includes receiving activity data for the user over a period of days, the activity data collected by a geo-position device. The method further includes determining routine travel paths for the user based on the activity data, and then determining recommendations based at least in part on the routine travel paths of the user. The method also includes sending the recommendations to the user.

Pursuant to another exemplary embodiment of the disclosure, there is provided a non-transient computer readable medium containing instructions for making recommendations for a user of an activity tracking system. The instructions for making recommendations include receiving activity data for the user over a period of days, the activity data collected by a geo-position device, and then determining routine travel paths for the user based on the activity data. In addition, the instructions include determining recommendations based at least in part on the routine travel paths of the user. Furthermore, the instructions include sending the recommendations to the user.

Pursuant to yet another exemplary embodiment of the disclosure, there is provided an activity tracking system comprising a geo-position device configured to be carried by a user and a display device associated with the geo-position device, the display device including a display screen. The geo-position device is configured to obtain activity data for the user over a period of days, determine routine travel paths for the user based on the activity data, determine recommendations based at least in part on the routine travel paths of the user, and display the recommendations to the user on the display device.

According to another exemplary embodiment of the disclosure, there is provided a method of making recommendations for a user of an activity tracking system. The method comprises associating one or more goals with the user, and obtaining geo-position data for the user from a geo-position device. Thereafter, the method includes determining a recommendation for the user. The recommendation is based at least in part on the geo-position data for the user and the one or more goals associated with the user. The method further comprises sending the recommendation to the user.

The above described features and advantages, as well as others, will become more readily apparent to those of ordinary skill in the art by reference to the following detailed description and accompanying drawings. While it would be desirable to provide an activity tracking system that provides one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

The drawings depict one or more embodiments of a system and method for providing purchase recommendations based on activity data. A more complete understanding of such embodiments and the advantages thereof may be acquired by referring to the following description, taken in conjunction with the accompanying drawings in which like reference numbers indicate like features and wherein:

FIG. 5 is an exemplary table identifying edges from the graph of FIG. 4 traversed by a user over a period of time, the edges establishing a routine travel path of the user;

FIG. 12 is an exemplary table illustrating venue data in association with the activity tracking system of FIG. 2.

DESCRIPTION

Figure 1:
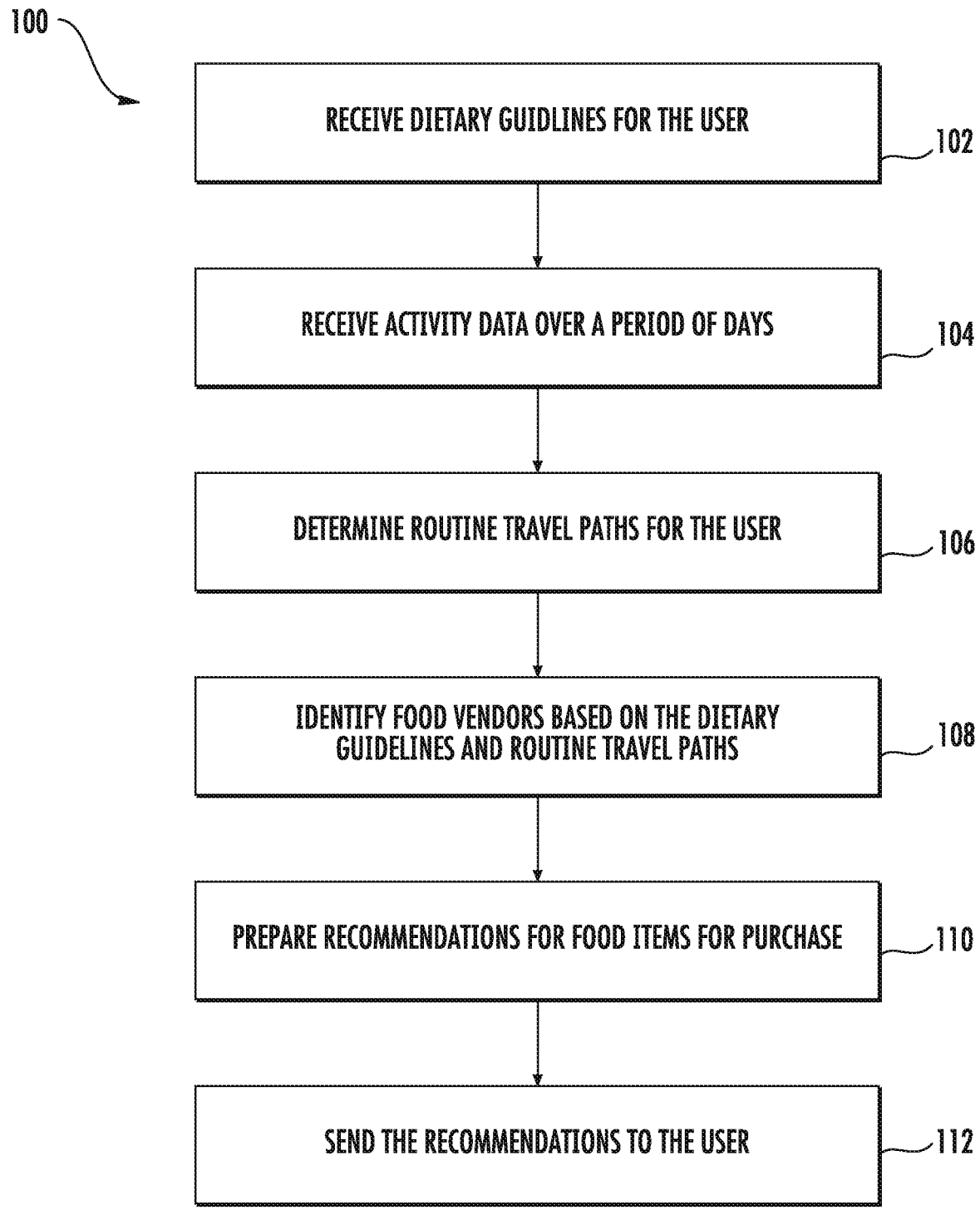
FIG. 1 is a block diagram of a method for providing purchase recommendations and particularly food purchase recommendations based on activity data.

With reference now to FIG. 1, an exemplary method 100 for providing recommendations, and particularly food purchase recommendations, based on activity data is shown. The method includes receiving dietary guidelines from the user of an activity tracking system as user diet data, as shown in step 102 of FIG. 1. The activity tracking system is configured to monitor and record the activity of the user based on activity monitoring devices, such as GPS-enabled devices, worn or carried by the user. As shown in step 104, the method further includes receiving activity data from the user over a period of days, such as several weeks or months. After receiving the activity data from the user for this period of time, the method includes determining a number of routine travel paths for the user, as noted in step 106 of FIG. 1. Thereafter, in step 108, food vendors are identified having food items for purchase that meet the dietary preferences or other dietary guidelines for the user. These food vendors are also identified based on their proximity to the determined routine travel paths of the user. In step 110, recommendations for food items for purchase by the user are assembled. These recommendations are then sent to the user in step 112. Any of various systems and arrangements may be used to accomplish the method 100. At least one exemplary system is discussed in further detail below with reference to FIGS. 2-10.

While various exemplary embodiments of the system and method are described herein with reference to food purchase recommendations, it will be recognized that the system may also be configured to make any of various types recommendations, such as healthy living recommendations or recommendations for other items for purchase that are not food items. These recommendations may be related to any of various activities, goods, services, or other options. For example, the system and embodiments described herein may be configured to make recommendations for related to athletic training classes, fitness activities, personal care, wellness, healthy living, or any of various other options, whether for purchase or otherwise, which may be desirable or needed for any of various individuals making use of the activity tracking system. Thus the term "recommendation" as used herein is not limited to a purchase recommendation. Furthermore, the term "items for purchase" as used herein is not limited to goods, but also includes services. Therefore, a "purchase recommendation" (which may also be referred to herein as a "recommendation for an item for purchase") may be a recommendation for a user to purchase a good such as a food product, but may also be a recommendation for the user to purchase a service, such as a manicure or other personal service. Also, a "recommendation" is not limited to a single option, but may include multiple recommended options, and any one or more of said multiple options may be selected by the user. Similarly, the term "food item" as used herein is not limited to a single food item, but may refer to multiple food items. Moreover, the term "food item" as used herein refers to any of various types of consumable items including solid or liquid foods, beverages, herbs, drugs, remedies, or any of various other consumable items.

Activity Tracking System

Figure 2:
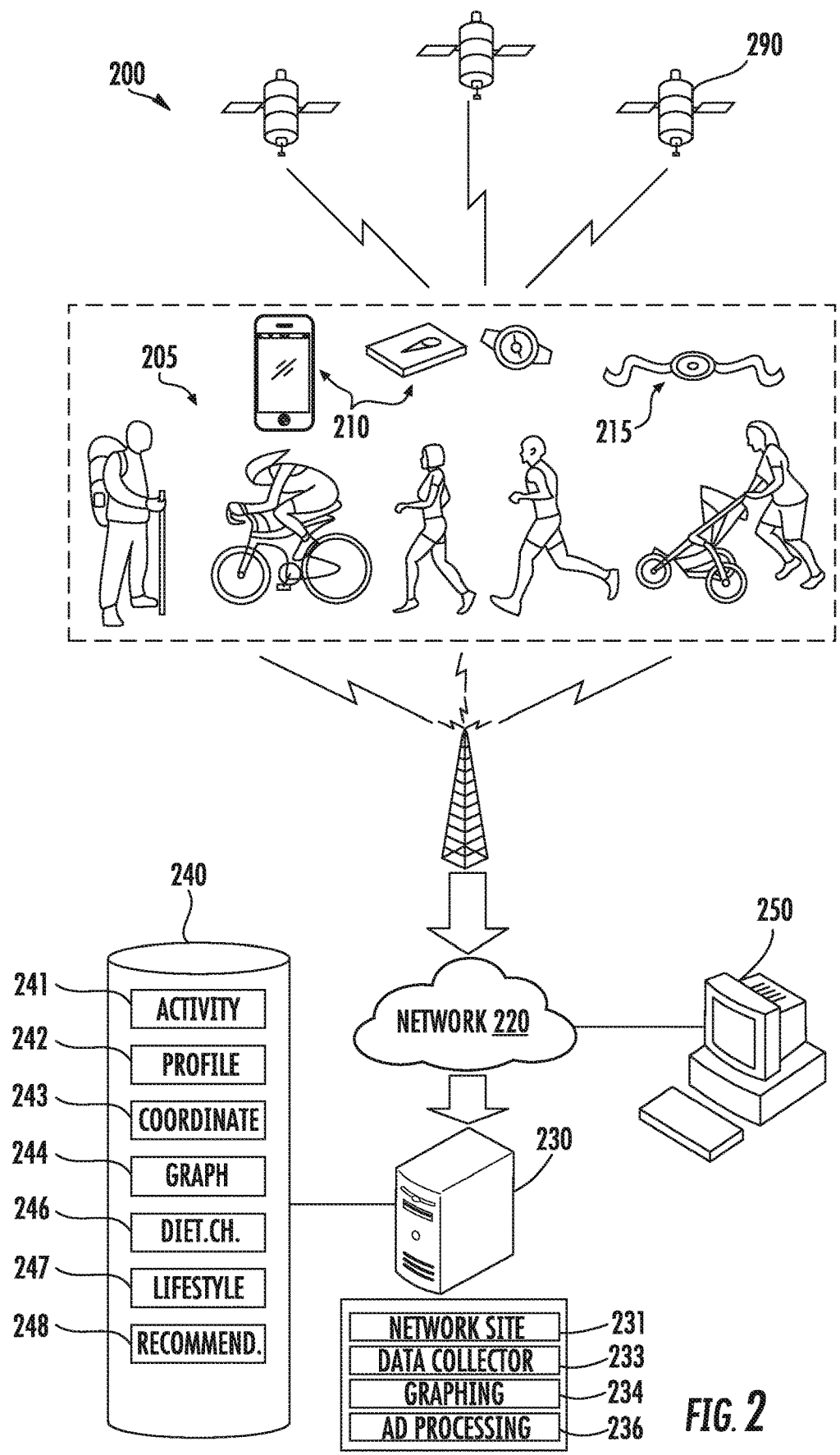
FIG. 2 is a diagram illustrating an embodiment of an activity tracking system configured to provide activity data for a plurality of users.

With reference now to FIG. 2, a diagrammatic representation of an exemplary activity tracking system 200 is shown. The activity tracking system includes Global Positioning System (GPS) enabled devices 210 or other geo-position devices in communication with a server 230 or other remote computer over a network 220. As shown in FIG. 2, the GPS-enabled devices 210 are configured to be worn, carried, or otherwise associated with a user 205 during a workout, walk, run, ride, vehicular travel or other activity of the user. The GPS-enabled devices 210 receive GPS signals from GPS satellites 290 and process the GPS signals in order to collect GPS data for the user 205 during activity of the user.

GPS-enabled devices 210 include devices configured with GPS receivers. Examples of such GPS-enabled devices include smartphones, tablet computers, GPS watches, etc. GPS data collected by the GPS-enabled devices 210 may include, for example, timestamp, latitude, longitude, distance, and elevation data. GPS data is typically collected and determined on a real-time basis with the GPS-enabled devices 210.

In addition to collecting GPS data, The GPS-enabled devices 210 may also be configured to collect sensor data from one or more sensors 215 which are associated with the GPS-enabled device. Sensors associated with the GPS-enabled device 210 may be housed within the GPS-enabled device or separately from the GPS-enabled device. If housed separately from the GPS-enabled device a wireless connection is typically established between the GPS-enabled device and the sensor to allow the sensor to transmit sensor data which is received by the GPS-enabled device. Exemplary sensors may include heart rate monitors, accelerometers, breathing sensor, temperature sensors, or any of various other sensors typically associated with athletic activity. Exemplary sensor data may include heart rate, power, motion, movement, speed, range, distance, acceleration data, etc. Sensor data may include physiological data (e.g., heart rate, breathing rate, temperature, etc.) or contextual readings or calculations (e.g., distance travelled, acceleration, etc.), or estimates of such associated with various physical activities of the user. Sensor data may be collected or determined in real time or stored on a device (e.g., a GPS-enabled device) and transmitted on a regular basis.

The term "travel event" as used herein refers to the occurrence of human movement over some minimum distance (e.g., ten meters, one hundred meters, or some other threshold distance of travel). The term "workout" as used herein refers to human movement and activity associated with physical fitness, such as running, jogging, walking, human powered cycling, or similar human powered activity. A workout may or may not be a travel event (e.g., stationary bicycling may not meet the threshold distance requirements for a travel event). The term "athletic activity data" refers to activity data collected for a workout. The term "activity data" as used herein refers to data collected during a workout or a travel event. Activity data may include GPS data or other geo-position data collected during a travel event and may also include additional data related to an activity such as sensor data. Activity data may be collected during the course of human-powered activities such as walking, running, or biking, or may be collected during human travel powered by non-human means, such as car or other vehicle travel.

In order to collect and process the activity data, the GPS-enabled devices 210 typically include a plurality of electronic components including receivers, memories, processors, I/O devices, and transmitters. The GPS-enabled devices 210 may be configured to process the activity data to determine any of various additional athletic parameters for the user. In addition to collecting and processing the activity data, the GPS-enabled devices 210 may also be configured to display the activity data on a display device, such as a display screen coupled to or otherwise associated with the GPS-enabled device, thus allowing the user 205 to view the activity data and any additional athletic parameters for the user. Furthermore the GPS-enabled devices 210 include transmitters that are configured to transmit the activity data to the server 230 over the network 220 (e.g., the Internet, cellular network, LAN or other network). Such transmitters are typically wireless transmitters (e.g., cellular network transmitters, Wi-Fi transmitters, etc.). However, in at least one embodiment, the transmitters may be used in association with data ports requiring a physical (i.e., wired) connection to another device prior to transmission of the data.

With continued reference to the embodiment of FIG. 2, the activity tracking system 200 includes a computing device (i.e., one or more computing devices), such as the server 230 (which may comprise a plurality of servers) configured to perform a plurality of functions embodied in various subsystems. Examples of such functions and subsystems include, but are not limited to, network site system 231, data collector system 233, graphing system 234, and activity data processing system 236. These functions and subsystems are typically provided as processing instructions stored on any of various types of computer readable media such as magnetic or optical discs, RAM or ROM memory, or any of various other computer-readable media. Those skilled in the art will appreciate that the example shown in FIG. 2 is non-limiting and that configuration of activity tracking system 200 may vary from implementation to implementation. The memory that retains the data and instructions discussed herein may be of any type of device capable of storing information accessible by the processor, such as a memory card, ROM, RAM, write-capable memories, read-only memories, hard drives, discs, flash memory, or any of various other computer-readable medium serving as data storage devices as will be recognized by those of ordinary skill in the art. Portions of the system and methods described herein may be implemented in suitable software code that may reside within the memory as software or firmware. A computer program product implementing an embodiment disclosed herein may therefore comprise one or more computer-readable storage media storing computer instructions translatable by a processor to provide an embodiment of a system or perform an embodiment of a method disclosed herein. Computer instructions may be provided by lines of code in any of various languages as will be recognized by those of ordinary skill in the art. A "non-transient computer-readable medium" may be any type of data storage medium that can store computer instructions, including, but not limited to the memory devices discussed above.

The GPS data (or other geo-position data) may be stored by GPS-enabled devices 210 (or other geo-position devices) during a travel event, such as a workout performed by a user (e.g., walking, jogging, running, biking, etc.) or general travel by the user (e.g., vehicular travel). This GPS data provides the geo-position information for the recorded activity (e.g., latitude and longitude data). As discussed previously, the GPS-enabled devices 210 may optionally record other data, such as the user's heart rate or power, at a varied sample rate (e.g., 1-100 Hz or other rate) depending on the activity type, and any additional information (e.g., cadence, stride rate, etc.) as appropriate, depending on the particular GPS-enabled device that is used.

When a workout or other travel event is completed by the user, the user instructs the device to send the recorded activity data over network 220 to the server 230. This can be sent directly if the device (such as a smartphone) has the capabilities. Otherwise, the device may be linked to a networked computer in order to deliver data. In other embodiments, the data may delivered real time or near real time using any of various networks.

The device 210 can provide this time series data for the activity, create a data file that is temporarily stored in memory, and send the data file. An example of activity data is provided in table 1, below.

TABLE 1

| timestamp | latitude | longitude | sensor data (e.g., heart rate) |
|---|---|---|---|
| 1.043567 | −97.3453452345 | 35.234523456 | 150 |
| 2.2345 | −97.3336362255 | 35.231213451 | 151 |
| 3.2345452 | −97.3336234534 | 35.193245234 | 150 |
| 4.234535 | −97.3434560120 | 35.225234623 | 150 |

The activity data in the table above includes GPS data and sensor data provided by a heart rate monitor. However, it will be recognized that the activity data may include any of various types of GPS data or sensor data, including various types of physiological and contextual data. For example, the activity data may further include workout type, workout start time, workout end time, altitude data, acceleration data, speed data, heart rate data (e.g., max or average), route identification, cadence data, distance data, or any of various other types of GPS data or sensor data.

Much of the activity data collected for a user during a travel event will be determined automatically by the GPS-enabled device 210. However, in some instances, manual entry of activity data may be requested. For example, depending on the type of GPS-enabled device, the device may require the user to enter a type of workout or travel event (e.g., biking, running, walking, car ride, etc.). However, in many situations, the type of workout may be determined automatically by the system depending on the activity data (e.g., accelerometer data may indicate whether the workout was a hike or a run). As another example of data that may need to be entered manually by the user, the GPS-enabled device may require the user to indicate the start of a workout manually by touching a physical button (e.g., a button on a watch or a smartphone), touching a virtual button (e.g., a button displayed on a touchscreen), or speaking to the GPS-enabled device that the workout should begin. However, in at least one embodiment, the GPS-enabled device may be configured to automatically determine the start of a workout or other travel event based on sensor signals (e.g., signals from an accelerometer indicating that the user started running at a particular time and has continued running for some period of time). After a start time has been established, a start position providing latitude and longitude for the user at the start of a workout may be automatically collected and stored. Thereafter, much of the activity data collected will occur automatically during the course of the workout or other travel event, depending on the GPS-enabled device being used (e.g., acceleration, velocity, distance traversed, heart rate, course taken, etc.). At the end of the travel event, the completion of the travel event may be determined either manually or automatically, depending on the GPS-enabled device used for the workout.

With continued reference to FIG. 2, network site 231 can provide a site accessible over a network such as the Internet or other network with an interface, such as an API, REST interface, thick client interface or other interface to allow GPS-enabled devices 210 or other client devices to interact with activity tracking system 200 to provide activity data and receive information. According to one embodiment of the activity tracking system 200, activity data may be forwarded to the server 230 over the network 220 by a mobile application on the GPS-enabled device that identifies a user associated with the GPS data and an indicator that the activity data is associated with a workout, a type of athletic activity (e.g., running, cycling, rowing, etc.), or a particular travel event of the user (e.g., morning commute, evening commute, drive to golf league, etc.).

Data collector 233 is configured to store the received activity data in a data store 240. The data store 240 is configured to store a large amount of activity data associated with users and workouts. In particular, as discussed in further detail below, activity data from large numbers of users is stored in the data store 240 over large periods of time. The data store 240 may be provided in any of various forms such as magnetic or optical disc or tape, electronic memory, or any of various other forms. Because of the large amounts of data contained in the data store 240, the data store 240 is generally provided as secondary storage, but could be provided within the main memory of primary storage. In other embodiments, the data store 240 may be provided as tertiary storage or even offline storage.

The data collector 233 stores the data collected from the GPS-enabled devices 210 in the data store 240 as activity data 241. Data for each workout or other travel event is stored as a record in the activity data 241. The data store 240 also includes additional data related to the activity data 241, including profile data 242, coordinate data 243, graph data 244, dietary choices data 246, lifestyle data 247, and recommendation data 248.

Profile data 242 includes a user profile for each user of the activity tracking system 200. Each user profile includes demographic information for the users such as name, age, gender, height, weight, performance level (e.g., beginner, intermediate, professional, etc.) or other information for the user.

The data store 240 also includes healthy choices data for the user. This healthy choices data may include a health canon or dogma followed by the user as well as personal preferences, such as dietary choices. As described in further detail below, the system may use any of the data in the data store 240 in order to make recommendations for the user. In at least one embodiment, the data store 240 comprises dietary choices data 246 including user diet data and food vendor data. The user diet data includes information about various dietary guidelines for each user, such as dietary restrictions or food preferences of the user. For example, the dietary choices data 246 may include an indication of health conditions of the user (e.g., diabetic, heart patient, celiac disease, etc.) or a type of diet the user should follow (e.g., low glycemic index, low sodium, gluten-free, etc.). As another example, the dietary choices data may include particular ethnic foods the user likes (e.g., Tai food, Mexican food, Japanese food, etc.), a general type of restaurant the user likes (e.g., steakhouse, soup and salad café, bars, etc.), specific chain or local restaurants the user likes (e.g., Subway, Starbucks, Morton's steakhouse, etc.), or specific types of foods or beverages the user enjoys (e.g., pastas, salads, deli sandwiches, burgers, sushi, coffee, smoothies, etc.). As explained in further detail below, the dietary choices data 246 is used by the activity tracking system 200 to make food purchase recommendations to the user. In at least one embodiment, the user diet data may be stored in the same database as the profile data 242. However, in other embodiments, the user diet data is stored in a separate database and simply associated with each user profile.

The dietary choices data 246 also includes food vendor data. This food vendor data includes information about food items for sale by various vendors. The food vendor data may include general information about each restaurant, or may also include more detailed information about specific food items offered by each restaurant. For example, the food vendor data may include nutritional information such as calorie, carbohydrate, fat, or sugar content of specific dishes, packaged items or other food items offered for sale by the vendor. The food vendor data may also include information related to the geographic location of each food vendor. Alternatively, the food vendor may be stored in the coordinate data database 243 or the graph database 244 and associated with a geographic location in such database.

The lifestyle data 247 is also included in the data store 240. The lifestyle data 247 includes goal data and venue data. The goal data is associated with each user profile and includes information about each user's particular goals. In at least one embodiment, goal data may indicate health and fitness goals of the user. For example, the goal data may include a target body weight, body fat, blood pressure, resting heart rate, activity level, workout frequency, or other health and fitness goal. As another example, goal data may include a training program, health canon or dogma followed by the user (e.g., distance running, CrossFit, Zumba, yoga, Couch to 5K, etc.) or a lifestyle philosophy followed by the user (e.g., meditation and wellness, aesthetical experience, religion and healing, etc.). As explained in further detail below, the goal data is used by the activity tracking system 200 to make recommendations to the user. While the user goal data has been described herein as residing in a separate database from the profile data 242 and simply associated with each user profile, in at least one embodiment the user goal data may be stored in the same database as the profile data 242.

Although the goal data included as part of the lifestyle data 247 has been described above as being distinct from the user diet data included as part of the dietary choices data 246, it will be recognized that in some embodiments the dietary choices data 246 and the lifestyle data 247 may overlap or may be included as part of the same database. For example, both the user diet data and the user goal data may indicate that the user is a "vegetarian," "vegan," or "Atkins Diet". Accordingly, it will be recognized that the term "goal data" as used herein is not limited to health and fitness goals, but may also cover dietary preferences, philosophies and lifestyle decisions adopted by the user.

The lifestyle data 247 also includes venue data. This venue data includes information about vendors, service providers, establishments or locations that may be accessed by the user to allow the user achieve his or her goals. For example, the venue data may include data related to a gym, workout facility, studio, spa, masseuse, therapist, class, school, field, track, church, art gallery, or any of various other establishments or locations, whether public or private. The venue data may include specific information about activities that may be conducted at the venue, costs associated with such activities, hours of operation, physical address or other location identification, and any other information related to the venue.

As noted above, the system may use any of the data in the data store 240, including the healthy choices data 246 and the lifestyle data 247 in order to make recommendations for the user. These recommendations are included in the data store 240 as recommendations data 248. As explained in further detail below, the recommendations data may include both food recommendations and lifestyle recommendations. The food recommendations may include purchase recommendations for various foods for the user to purchase from various food vendors. The food recommendations may be complete meals or individual servings recommended for purchase from a restaurant or other food vendor, ingredients or other individual food items recommended for purchase from a grocer or other food vendor, or recommended recipes or meals for the user to prepare at his or her residence. Lifestyle recommendations include recommendations for various venues for the user to visit based at least in part on his or her stated goals. Additional information and examples concerning food recommendations and lifestyle recommendations are provided in further detail below with reference to FIGS. 4-12.

With continued reference to FIG. 2, coordinate data 243 may also be included in the data store 240, wherein known maps are defined by the coordinate data 243. Additionally, the coordinate data 243 may include path traversal for workouts and other travel events that are stored as a series of coordinates. It will be recognized that activity data 241 and profile data 242 may be stored such that each GPS track (i.e., traversals of a particular street or path network defined by time-series GPS data) collected by the system is associated with a travel event (e.g., by unique travel ID), and each travel event is associated with a user and date as well as other information.

Mapping system 234 is configured analyze GPS tracks (such as GPS tracks of activity data 241) and construct a graph as graph data 244 stored in memory of the data store 240. To this end, the mapping system 234 is configured to associate each travel event with a portion of a known map. In particular, mapping system 234 may associate a travel event with a series of streets and intersections the user traversed during the travel event. Mapping system 234 may create a visual representation of the graph data 244 as a map that can be viewed on a client device such as a GPS-enabled device 210 or client device 250 connected to the server 230 to show street networks and other paths, such as the path traversed by the user 205 during a workout. In addition to showing street networks and paths, the graph data is further configured to show food vendor data and venue data located along such street networks and paths.

Activity data processing system 236 is configured to process the received activity data for workouts and place it into proper form for storage as activity data 241 in the data store 240. For example, all user names are processed to be become lower case, which is the proper format for the database. As another example, if the received activity data from a GPS-enabled device does not include distance traversed during a workout, the activity data processing system 236 determines a distance travelled based on the latitude and longitude data points collected for the workout.

In addition to processing activity data for individual workouts, the activity data processing system 236 may also be configured to perform additional processing on the activity data 241. For example, the activity data processing system 236 may perform a clustering algorithm on the activity data, as noted below. As also explained in further detail below, the activity data processing system 236 may also calculate routine travel paths for a user and determine recommendations for food items for the user to purchase.

Activity Tracking System within a Network Computing Environment

Figure 3:
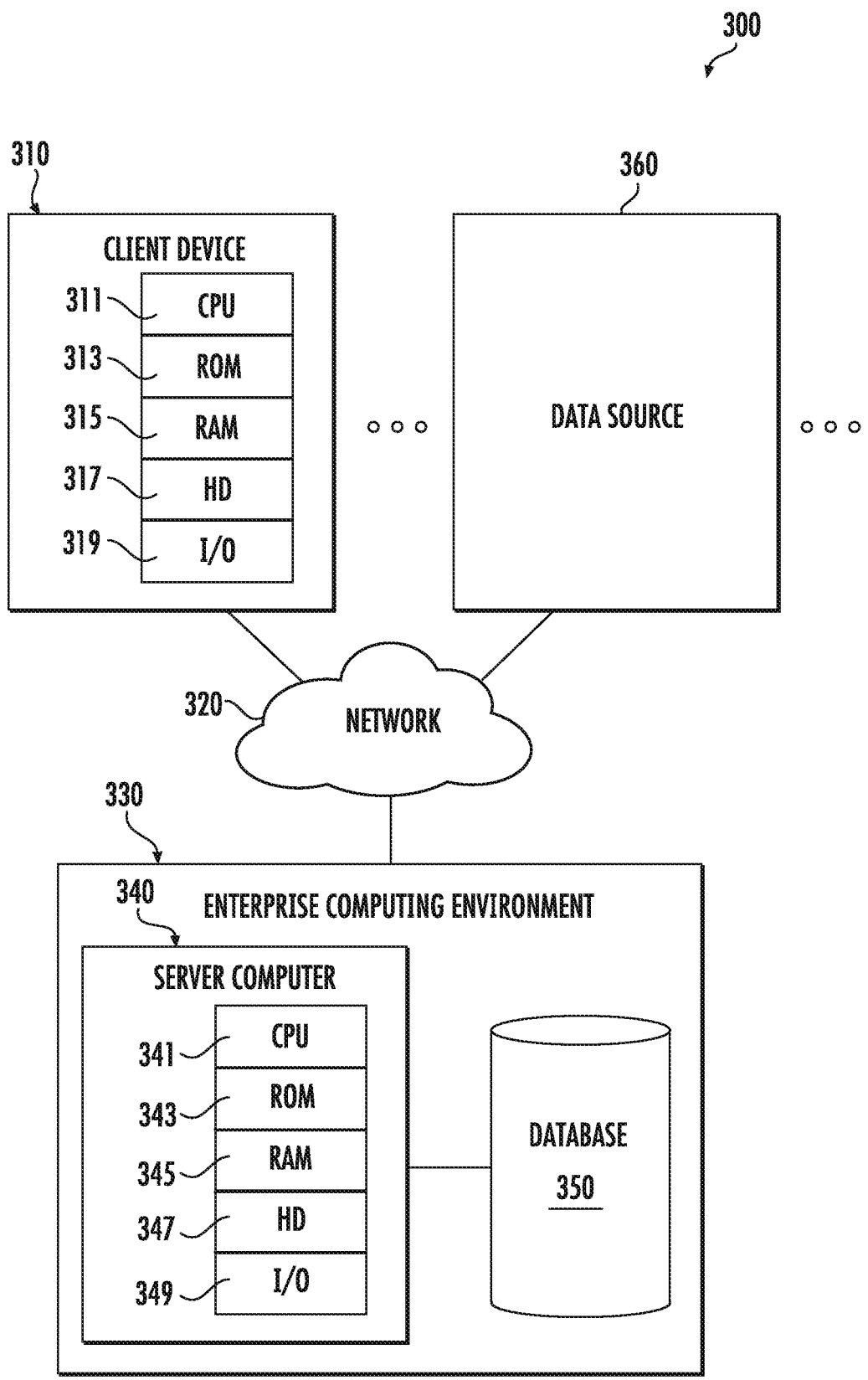
FIG. 3 is a diagram of a computer network computing environment including a client computer and a server computer for the activity tracking system of FIG. 2.

With reference now to FIG. 3 a diagrammatic representation of one embodiment of a network computing environment 300 is shown that may be used to implement the activity tracking system 200. For purposes of clarity, a single client computer 310 (which may be a GPS enabled device 210 or other geo-position device), a single server computer 340 (which may be the server 230 of FIG. 2), and a single data source 360 are shown in the figure. The client computer 310, server computer 340 and data source 360 represent an exemplary hardware configuration of data processing systems that are capable of bi-directionally communicating with each other over a public network such as the Internet. Those skilled in the art will appreciate that network computing environment 300 may comprise multiple server computers, and multiple client computers and data sources may be bi-directionally coupled to enterprise computing environment 330 over network 320.

Client computer 310 is a GPS-enabled device, such as GPS-enabled device 210 described previously with reference to FIG. 2. The client computer 310 can include central processing unit ("CPU") 311 or other processor, read-only memory ("ROM") 313, random access memory ("RAM") 315, ("HD") or storage memory 317, and input/output device(s) ("I/O") 319. I/O 319 can include a keyboard, monitor, printer, and/or electronic pointing device. Example of electronic pointing devices for I/O 319 may include mouse, trackball, stylist, touch screen, or the like. Client computer 310 can include a cellular phone, a smart phone, a GPS phone, or any device capable of geo-tagging and communicating over a network.

Server computer 340 may have similar hardware components including CPU 341, ROM 343, RAM 345, hard drive 347, and I/O 349. Data source 360 may be a server computer having hardware components similar to those of client computer 310 and server computer 340, or it may be a data storage device. Server computer 340 in association with client device 310 may provide one embodiment of an activity tracking system.

The data source 360 includes any device that may provide data to the network 320 for use in the activity tracking system 200. For example, activity data may be provided to the client device 310 in the form of GPS data or sensor data. This activity data may then be transferred to the server computer 340 over the network 320. As another example, sensor data from a workout may be downloaded by the user to another computer and then delivered to server computer 340 over the network 320. In at least one embodiment, server computer 340 may also share data (e.g., application updates, etc.) to the client device 310 over the network 320.

Each computer 310 and 340 shown in FIG. 3 is an example of a data processing system. ROM 313 and 343, RAM 315 and 345, storage memory/drives 317 and 347, and database 350 can include media that can be read by CPU 311 and/or 341. Therefore, these types of computer memories include computer-readable storage media. These memories may be internal or external to computers 310 and/or 340.

As will be recognized by those of ordinary skill in the art, portions of the methods described herein may be implemented in suitable software code that may reside within ROM 343, RAM 345, hard drive 347, database 350, data source 360 or a combination thereof. In some embodiments, computer instructions implementing an embodiment disclosed herein may be stored on a direct access storage device (DASD), magnetic device, disk device, optical storage device, or other appropriate computer-readable storage medium or storage device. A computer program product implementing an embodiment disclosed herein may therefore comprise one or more computer-readable storage media storing computer instructions translatable by CPU 341 to perform an embodiment of a method disclosed herein.

A "computer-readable medium" may be any type of data storage medium that can store computer instructions and/or data, including, read-only memory (ROM), random access memory (RAM), hard disks (HD), data cartridges, data backup magnetic tapes, floppy diskettes, flash memory, optical data storage, CD-ROMs, or the like. The computer readable medium can be, by way of example, only but not by limitation, an electronic, magnetic, optical, electromagnetic, infrared, or semiconductor system, apparatus, system, device, or computer memory. The computer readable medium may include multiple computer readable media storing computer executable instructions, such as in a distributed system or instructions stored across an array.

Collection of Activity Data

The activity tracking system is used to collect activity data from users across wide geographic regions on a continuing basis. Indeed, the activity tracking system may be configured to collect activity data from a user at any location in the world where the user is carrying a GPS-enabled device 210 and is connected to the network 220. For example, activity data may be collected for users using a GPS-enabled device 201 in association with the activity tracking system 200 in any of vast regions of North America, Europe, or other continents where cellular telephone networks are available, such as regions near larger cities. The collection of activity data may not be possible in more remote regions or in countries lacking wide-ranging cellular networks and Internet service. However, even in more remote regions, it may be possible for the athlete to store activity data on his or her GPS-enabled device 210 and then download the activity data to the server 230 at a later time when a connection to the network 220 is established.

As the user 205 carries the GPS-enabled device 210 during a travel event, a time-stamped series of GPS coordinates is collected. The GPS coordinates are transmitted over the network 220 to the server 230 and stored within the data store. If a user carries a GPS-enabled device 210 during a period of days and numerous travel events, the activity tracking system may be configured to detect travel routines for the user, as discussed in further detail below.

Use of Nodes and Edges to Represent GPS Data

With continued reference to FIG. 2, the graphing system 234 is configured to prepare a graph from a set of coordinate data 243 (which may also be referred to herein as "map data"), and store such graphs as graph data 244 in the data store 240. The graphs may be provided as maps that show the physical layout of a network of streets, with buildings, parks and other physical structures also indicated on the map. Also, the graphs may include map overlays wherein GPS data or other activity data is mapped to the graph in order to show the traversal of a user over the network of streets on a map. As explained in further detail below, a user may view a graph as a map on a display screen, wherein the map shows a network of streets and a related map overlay that shows the course travelled by the user during a workout.

According to one embodiment, coordinate data 243 can be a set of latitude and longitude coordinates for streets with coordinates appearing at each intersection. For example, U.S. census publishes a database of latitude and longitude sequences for every street recorded, with nodes appearing at every intersection. (Topologically Integrated Geographic Encoding and Referencing files available from United States Census Bureau). Graphing system 234 can analyze the map data and build a network of streets by assuming that overlapping streets represent an intersection, and mark each of these nodes with a single unique value. Alternatively, OpenStreetMap.org (www.OpenStreetMap.org) regularly publishes more complete datasets with explicit connectivity. Moreover, as described in U.S. patent application Ser. No. 14/658,935, filed Mar. 16, 2015, the contents of which are incorporated herein in their entirety, activity data from various users of the activity tracking system 200 may be used to generate maps as well as update known maps to include additional paths. As described in U.S. patent application Ser. No. 14/658,935, a map may be defined as a network of nodes and edges.

In addition to street data, map data 243 may also include other data which may be provided from other sources. For example, map data 243 may also include coordinates for various commercial establishments, such as restaurants or grocery stores, allowing the graphing system 234 to associate particular commercial establishments as being located along a given route, or within close proximity of a given route.

Figure 4:
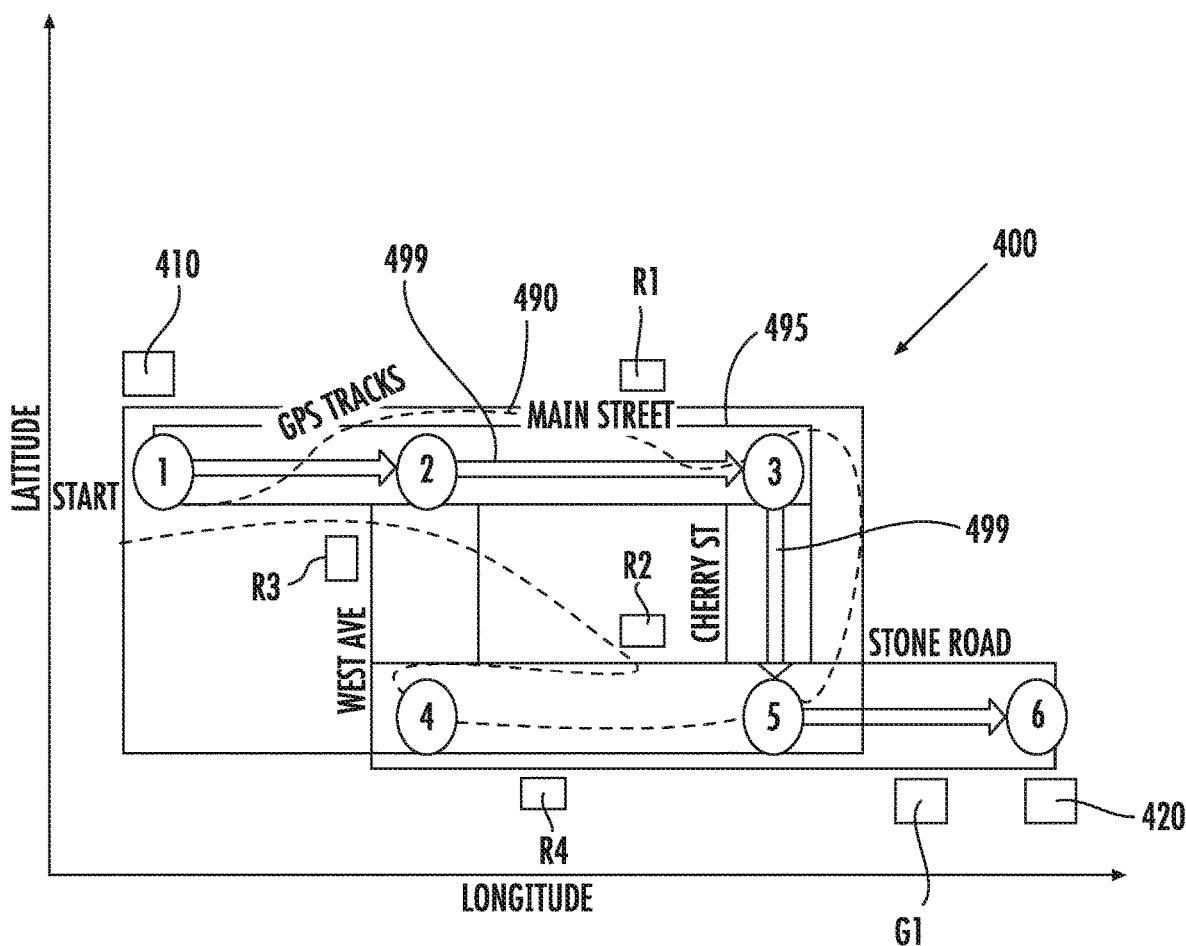
FIG. 4 is an exemplary map illustrating a street network for which a graph is created in association with a routine travel path of a user of the activity tracking system of FIG. 2.

With reference now to FIG. 4, a simplified example of a region with a street network 400 of interest for which a graph is to be created is illustrated. As shown in FIG. 4, map data for a road system may include the following data for a simplified example:

Main Street: Lat=y1, Lon=x1; Lat=y1, Lon=x2; Lat=y1, Lon=x3;

Stone Road: Lat=y2, Lon=x2; Lat=y2, Lon=x3; Lat=y2, Lon=x4;

West Ave: Lat=y2, Lon=x2; Lat=y1, Lon=x2; and

Cherry Street: Lat=y1, Lon=x3; Lat=y2, Lon=x3

Other information may also be included such as altitude, etc. The data can be mapped to a series of nodes and edges. The nodes are specific points on the map. The nodes are typically street or path intersections, but are not necessarily street or path intersections. For example, as described in U.S. patent application Ser. No. 14/658,935, the nodes may be defined from a plurality of GPS tracks as the points of greater curvature (which includes intersections, but is not limited to intersections). The points of greater curvature are extracted in a route simplification process and grouped according to a clustering algorithm to result in a plurality of nodes. The edges are connecting paths or lines between the nodes.

In FIG. 4, the example street network can be described as a list of labeled nodes (labeled 1-6), the positions of those nodes (a latitude, longitude coordinate for each node), and list of edges extending between the nodes, with each edge represented as with an ordered pair of nodes:

$$G=(1,2),(2,3),(2,4),(3,5),(4,5),(5,6),$$

where G is a graph describing the example street network of FIG. 4 (i.e., the nodes and connections that define the route segments along and between Main Street, West Ave., Cherry Street, and Stone Road) as a list of ordered pairs of nodes. Each ordered pair of nodes describes an edge (i.e., a connection or path between nodes). This list of ordered pairs assumes that graph G is undirected, so that ordered pairs (1,2) and (2,1) are redundant and represent a single edge. However, some operations and/or metrics may use a directed graph (such as elevation). Transforming graph objects between directed and undirected states will be understood by those of ordinary skill in the art.

Mapping GPS Data to Graph G

After the graph G is created, multiple GPS data time-series can be mapped onto the graph G to show one or more routes that have been traversed over the represented street network. Each such route that has been traversed by a user is defined by a time-series of GPS data and is referred to herein as a "GPS track". A GPS track may represent a route taken by a user during a travel event, such as a walk, run, biking workout, car ride with a GPS-enabled device, or other monitored traversal of the route.

FIG. 4 shows the street network 400 with an exemplary GPS track 490 taken by a user as illustrated by the dotted line path. The GPS-enabled device carried by the user collects GPS data points as the user traverses the GPS track and transmits the GPS data points to the activity tracking system 200 over the network 220. For every GPS data point for a GPS track 490, a network computing device (e.g., server 230) computes the nearest node, forming a list. To limit this search for computational efficiency, it may be preferable to only use nodes inside a bounding box 495 formed from the minimums and maximums of the longitude and latitude of track 490, respectively. For larger activities, it may be more computationally efficient to form a bounded polygon made up from a simplified GPS sequence. For simplification, Ramer Douglas Puekcer algorithm or other algorithm known or developed in the art may be used to form the bounding box. For forming the polygon from the points, the linestring.buffer function in the Shapely python library or other mechanism known or developed in the art may be used.

According to one embodiment, in order to map a GPS track to the graph G, a list or sequence of nodes of equal length to the number of GPS points is formed. Each node on the list represents the node on the graph G that the user 205 was closest to at the time the GPS coordinates were determined by the GPS-enabled device 210. For example consider a user moving from node 1 to node 2 of FIG. 4 wherein twenty GPS data points are collected as the user moves from node 1 to node 2. The earlier-in-time GPS data will show that the user is closest to node 1, and therefore each of these GPS data points (i.e., latitude and longitude coordinates) is associated with node 1. The later-in-time GPS data will show that the user is closest to node 2, and therefore each of these GPS data points is associated with node 2. At some point as the user moves in-between node 1 and node 2 a transition is made from the GPS data point being associated with node 1 to the GPS data point being associated with node 2. In the example where twenty GPS data points are collected between node 1 and node 2, a data point near the eleventh GPS data point may represent this transition from node 1 to node 2, assuming the user is moving at a constant pace. Accordingly, the list of GPS data points as the user moves from node 1 to node 2 in this example would be as follows: 11111111111112222222222.

When a user traverses across several nodes during a GPS track, the list of GPS nodes will be redundant because the closest node only occasionally changes within the typical GPS data collection interval (e.g., 1 second). These redundant nodes can be advantageously removed. In particular, a series of the same node can be reduced to a single instance. For example, if GPS track 290 in FIG. 4 renders the node list 111111222233335555544444455522221111, the node list can be reduced to (1,2,3,5,4,5,2,1).

After preparing the sequence of nodes (1,2,3,5,4,5,2,1) as explained in the previous paragraph, the sequence of nodes can be transformed into to a list of edges (i.e., node pairs, each node pair representing a traversal from one node to the next. For example, the sequence of nodes (1,2,3,5,4,5,2,1) can be transformed into the following list of edges:

$$p=((1,2),(2,3),(3,5),(5,4),(4,5),(5,2),(2,1))$$

where p is the path (or list of edges) describing the activity of the user on GPS track 290. A path p created from a GPS track 290 may also be referred to herein as an "activity track". It will be noted that the activity tracks described as a list of nodes and edges are significantly simplified over a path that is described as a list of latitude/longitude coordinates. Accordingly, the activity data is provided in a format that is compact and relevant to recommendations (i.e., edge intersections instead of latitude/longitude data). The activity data in this situation is not GPS data. Instead, the activity data describes the user as moving from one intersection to another (i.e., edge/node data). As described in further detail below, this representation of the user's behavior makes it computationally feasible to make recommendations about a user's health-related purchases. Those recommendations can be relevant because they are geo-located.

Comparing the list of edges for GPS track 490 (i.e., (1,2),(2,3),(3,5),(5,4),(4,5),(5,2),(2,1)) to the graph G of FIG. 4 (i.e., G=(1,2), (2,3), (2,4), (4,5), (5,6)), it will be noted that one edge in path p does not exist in graph G. In particular, the graph G does not show the (5,2) edge. The reason for this may be one of two reasons: (i) an error occurred with the GPS data, or (ii) there is a new path between the nodes that has yet to be defined in the graph G.

As noted previously, GPS data can be associated with a specific workout, user, and other information. Similarly, the path p for a GPS track may also be associated with a specific workout, user, or other information. In some cases, a path may represent a single travel event or an aggregation of travel events for a user over a period of time, say a week or a year. For example, a path may represent a typical commute to work for a user during a year.

Determining Routine Travel Paths

Routine travel paths may be determined in a number of different manners. In at least one embodiment, a routine travel path (which may also be referred to herein as a "RTP") may be determined by analyzing the edges traversed by the user over a number of days at a given time. For example, consider a user who works at an office near node 1 of FIG. 4 and lives at an apartment near node 6 of FIG. 4. On a typical evening this user typically travels from his office 410 on Main Street to his home 420 on Stone Road along the following sequence of nodes: 1-2-3-5-6. However, on some days, the user may take a detour from the typical commute. For example, as illustrated by the dotted lines in FIG. 4, during one evening commute, the user realizes at node 5 that he left his laptop computer at the office, and travels back toward the office along Stone Road in the direction of node 4. After reaching node 4, the user decides to purchase a take-out dinner at a restaurant R2 which he just passed on Stone Road, so the user returns to the restaurant R2. Thereafter, the user takes a back alley path to West Avenue, and then returns to the office 410 to retrieve his computer.

The above-described route of the user is described as a traversal of edges on the chart of FIG. 5 in the column labeled "Monday PM #1". The number of times a user traversed each of a number of edges during the travel event is listed as a number in the column. Therefore, in the above commute example, the user traveled along "Edge 1" on two occasions, so a "2" is listed in the chart on that row. The user traveled along "Edge 2" once, so a "1" is listed in the chart on that row. Similarly, a "1" is listed on the "Edge 4" row and a "2" is listed on the "Edge 6" row.

The chart of FIG. 5 also includes three additional columns representing three more typical Monday evening commutes where the user traveled only along edges 1, 2, 4 and 5 (i.e., "Monday PM #2", "Monday PM #3" and "Monday PM #4"). If a table of commute information is collected over a long period of time, a series of edges traveled during a typical commute may be easily determined. In the example of FIG. 5, the edges traversed by the user during a Monday evening commute are collected over four weeks and then analyzed to determine a routine travel path. However, it will be recognized that the time periods used to collect information for determination of routine travel paths may differ (e.g., three weeks, four weeks, four years, etc.). In at least one embodiment, only recent data is collected when routine travel paths are determined (e.g., only activity data within the past two months, one year, etc.).

A number of different criteria may be used to determine a routine travel path such as a typical Monday evening commute. For example, travel routines may be determined by a user traveling a particular edge 75% of the time during a particular time period. Based on this criterion, it can be determined that the user represented in FIG. 5 has a routine travel path covering nodes 1, 2, 4 and 5 on a typical Monday evening commute. The Monday evening commute RTP is represented in FIG. 4 by arrows 499, which extend through nodes 1, 2, 3, 5 and 6, along edges E1(1,2), E2(2,3), E4(3,5) and E5(5,6). Similar routine travel path determinations may be made for the user for other typical travel times, such as morning commutes or weekend activities. While the foregoing example provides one embodiment of a particular criterion and method for determining routine travel paths, it will be recognized that any of numerous other criteria or methods may be utilized to determine routine travel paths for a user.

Purchase Recommendations Based on Travel Routines

The routine travel paths determined by the activity tracking system 200 are used in association with the dietary choices data 246, including both the user diet data and the food vendor data, to make recommendations to the user concerning certain purchases, such as healthy food purchases. A simplified example of food vendor data is presented in FIG. 6 in the form of a table 600 representing a relational database. The table 600 includes a number of food vendors in a first column 602, at least one edge associated with each vendor in a second column 604, and a number of food attributes for each vendor in additional columns 606, 608 and 610.

Figure 6:
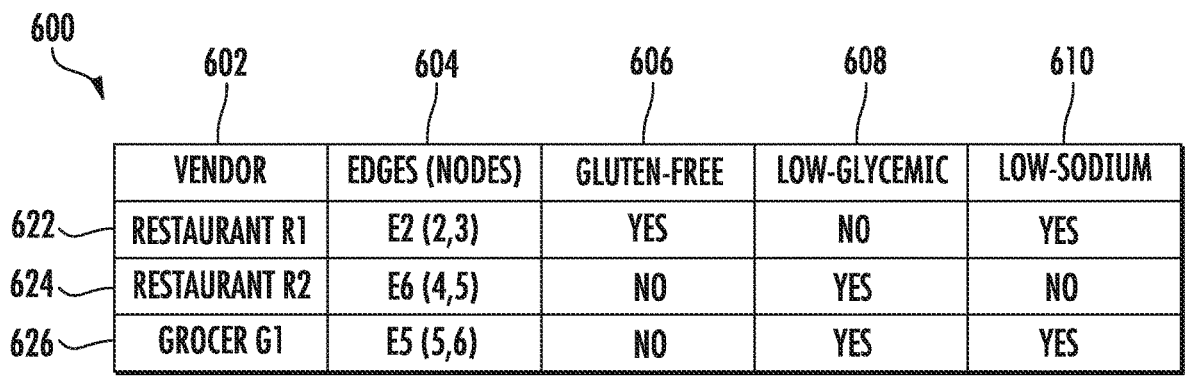
FIG. 6 is an exemplary table illustrating food vendor data in association with the activity tracking system of FIG. 2.

In the example of FIG. 6, the food vendors include "Restaurant $R_1$" (listed in a first row 622 of the table 600), "Restaurant $R_2$" (listed in a second row 624), and "Grocer $G_1$" (listed in a third row 626). Restaurant $R_1$ is identified on the map of FIG. 5 and is located on Main Street between nodes N2 and N3. Accordingly, in the table of FIG. 6, restaurant $R_1$ is associated with edge E2 (see column 604). As noted in the table 600, Restaurant $R_1$ includes gluten-free dining options (see col. 606) and low-sodium dining options (see col. 610), but does not include dining options with a low-glycemic load (see col. 608).

Restaurant $R_2$ is listed in row 624 of the table 600. Restaurant $R_2$ is identified on the map of FIG. 5 and is located on Stone Road between nodes N4 and N5. Accordingly, in the column 604 of the table 600 of FIG. 6, restaurant $R_2$ is associated with edge E6. As noted in the table 600, Restaurant $R_2$ offers meals for sale that meet the low-glycemic threshold for the system (see col. 608), but Restaurant $R_2$ does not include any gluten-free or low-sodium dining options (see cols. 606 and 610).

Grocer $G_1$ is listed in row 626 of the table 600. Grocer $G_1$ is identified on the map of FIG. 5 and is located on Stone Road between nodes N5 and N6. Accordingly, in the column 604 of the table 600 of FIG. 6, grocer $G_1$ is associated with edge E5. As noted in the table 600, Grocer $G_1$ includes low-glycemic and low-sodium dining options (see cols. 608 and 610), but does not include gluten-free dining options (see col. 606).

It will be recognized that any of various attributes may be stored in the database in association with various vendors. Therefore, while the gluten-free, low-glycemic, and low-sodium attributes are shown in the table 600, different or additional dining attributes may also be attributes stored by the system. These dining attributes may be health related, but may also be simple user preferences, such as favorite ethnic foods. Examples of other attributes that may be provided on the table 600 include low calorie meals, high carbohydrate meals, German food, Chinese food, seafood, salads, etc.

In addition to different attributes, different parameters and thresholds may be used by the system 200 to determine whether a vendor offers a food item having a particular attribute. These varying parameters and thresholds may depend in large part on the dietary theories and strategies espoused by the system. For example, one system administrator may configure the system such that a "low-sodium" dinner meal has less than 500 mg of sodium, while another system administrator may configure the system such that a "low-sodium" dinner meal has less than 900 mg of sodium. Such thresholds may also vary based on whether the meal is a breakfast, lunch or dinner meal (e.g., a low-sodium dinner meal may have a higher sodium content than a low-sodium lunch meal). In addition to different thresholds for such attributes, different parameters may also be used to determine an attribute. For example, a "low-glycemic" meal may be determined based on glycemic index or alternatively based on glycemic load.

In the embodiment of FIG. 6, each row of the table 600 lists only a single vendor and identifies various attributes for that vendor. However, in at least one alternative embodiment, specific food items for sale by the vendor are listed in the table 600 along with various attributes of that food item. Therefore, instead of simply identifying a particular vendor as offering gluten-free food choices, in this embodiment, a particular meal offered by the vendor may be identified as gluten-free (e.g., the "Chef's Salad" sold at Restaurant $R_1$). In this manner, additional information is provided to the user of the system, and more specific recommendations for food purchases may be made. Additionally, while it is anticipated that the dining options offered by a grocer or other non-restaurant vendor would be ready-to-eat food items offered from a deli or cafe of the grocer, it will be recognized that in some embodiments, these food items could also be pre-packaged food items that must be heated or otherwise prepared to some extent prior to the user eating the recommended food item (e.g., a frozen meal in the grocer's freezer aisle).

In the embodiment of FIG. 6, it will also be noted that only a single edge (provided as a combination of two nodes) is associated with each food vendor. However, in at least one embodiment, multiple edges may be associated with each vendor. The multiple edges could include a primary edge which represents a section of a street on which the food vendor is located (e.g., the street of the vendor's mailing address). In addition, the multiple edges could include secondary edges that are within a predetermined distance of the primary edge (e.g., edges within 500 yards of the primary edge). In this manner, users travelling on an RTP that passes within the predetermined distance of the food vendor may still receive recommendations about food vendors that are not directly on the RTP, but are within a reasonable detour from the RTP. Also, in at least one embodiment, different edges may be associated with a vendor depending on the mode of transportation of a user (e.g., walking, biking, car, etc.). Thus, for example, a user walking an RTP may receive recommendations for vendors within 1-250 yards of the RTP, or detours thereof. However, a biker may receive recommendations for vendors within 1-1000 yards of the RTP (or detours thereof), and car drivers may receive recommendations for vendors within 1-2 miles of the RTP (or detours thereof). Of course any of various other metrics may be used, depending on the desired operation of the activity tracking system.

Figure 7:
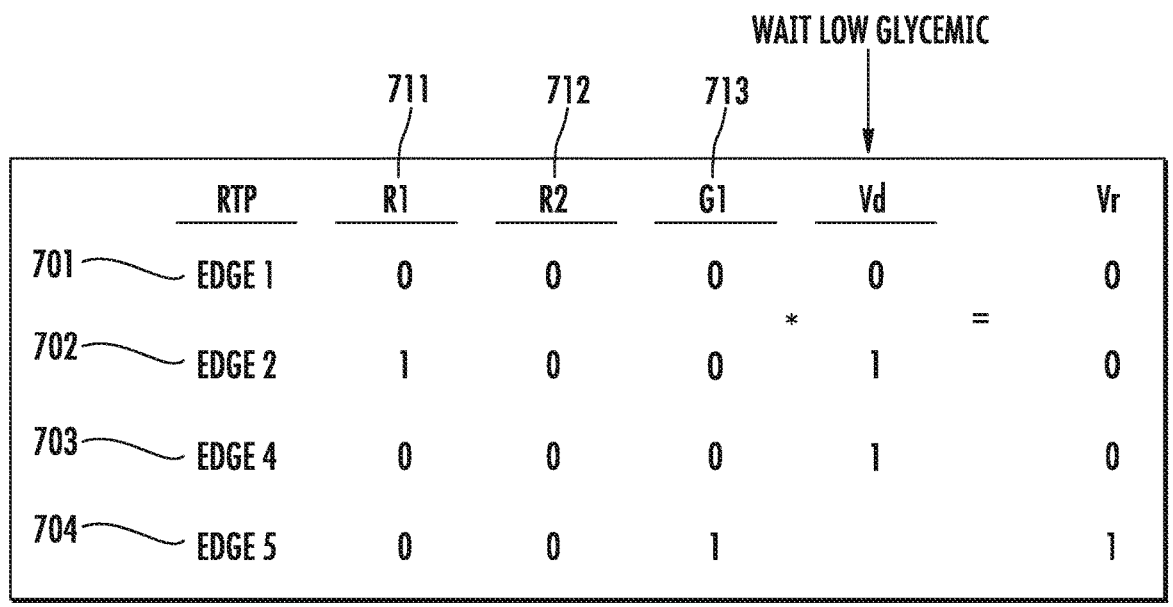
FIG. 7 is an exemplary matrix multiplication analysis using the data of FIG. 6 to arrive at a food purchase recommendation.

The dietary choices data, including both the food vendor data and the user diet data may be used in combination with the routine travel paths to make food purchase recommendations. FIG. 7 shows a simplified example of a method for making food purchase recommendations for a user using a matrix 700 and vector multiplication principles. In this example, the activity tracking system 200 has established a number of routine travel paths for the user, including a Monday evening commute RTP. Consider this Monday evening commute RTP to be the one discussed previously with reference to FIGS. 4 and 5, wherein the activity tracking system determined that the routine travel path of the user for his Monday evening commute extended across edges 1, 2, 4 and 5 (i.e., Edge1 (1,2), Edge2 (2,3), Edge4 (3,5), and Edge5 (5,6)). With this RTP and the dietary choices data 246 established, the activity tracking system 200 may be used to identify food vendors (and the associated food items for purchase) and prepare recommendations for the user concerning the food items for purchase.

In order to identify food items for purchase, the system first identifies the edges of the commute where food vendors are located offering food items that meet the user's dietary requirements. In order to identify these edges, a matrix is first created including the edges of the RTP represented in rows of the matrix and the food vendors represented in columns of the matrix. In the exemplary embodiment of FIG. 7, the edges of the Monday evening commute RTP (shown by arrows 499 in FIG. 4) are used to represent rows of a matrix 700. Accordingly, the matrix 700 of FIG. 7 includes four rows 701-704, each associated with edges 1, 2, 4 and 5 of FIG. 4. Additionally, the matrix of FIG. 7 includes three columns, 711-713 associated with each of the food vendors of FIG. 6 (i.e., Restaurant $R_1$, Restaurant $R_2$, and Grocer $G_1$). The numbers within the matrix include "1"s and "0"s. A "1" means that the vendor identified in the column is associated with the edge identified in the row. Thus, for Edge2 (row 702) and Restaurant $R_1$ (column 711), a "1" is provided in the matrix 700 because, as shown in FIG. 6, Restaurant $R_1$ is associated with Edge2. However, for Edge2 (row 702) and Restaurant $R_2$ (column 712), a "0" is provided in the matrix 700 because Restaurant $R_2$ is not associated with Edge2. The rest of the matrix is completed in a similar manner.

With the matrix 700 created, the matrix 700 is multiplied by a vector $v_d$ 750. The vector $v_d$ represents the user's dietary guidelines in association with each of the restaurants in the table 600. In this case, the user's dietary guidelines require a meal with a low-glycemic index. Accordingly, the vector $v_d$ lists a "1" or a "0" for each vector element, based on the offerings of the associated food vendor. In this case, Restaurant $R_1$ does not offer low-glycemic meals, so a "0" is the first vector element. However, Restaurant $R_2$ and Grocer $G_1$ both offer low-glycemic meals, so the next two elements of the vector are both "1". When the vector 750 is then multiplied by the matrix 700, the result is a resultant vector $v_r$ of length 4 (the same length as the number of rows of the matrix 700). The resultant vector $v_r$ in the example of FIG. 7 includes the numerals 0-0-0-1. Accordingly, the first three numerals (i.e., "0") in the resultant vector $v_r$ indicate that no vendors offering meals that meet the user's dietary guidelines are found along Edges 1, 2 or 4. However, the final numeral (i.e., "1") in the resultant vector $v_r$ indicates that a vendor offering meals that meet the user's dietary guidelines is found along Edge 5.

With the resultant vector $v_r$ indicating that a vendor offering meals that meet the user's dietary guidelines is located along Edge 5, the system 200 can use the table 600 of FIG. 6 to identify this vendor. In particular, the system 200 simply uses the table 600 to identify all restaurants that are associated with Edge 5 and low-glycemic meals. In this case, Grocer $G_1$ meets both conditions, and therefore the system 200 makes a food purchase recommendation for the Monday evening commute that a low-glycemic meal may be purchased from Grocer $G_1$. Accordingly, the activity tracking system 200 is configured to make recommendations for dining and food purchases based on the RTPs of the user. In the example of FIGS. 4-7, the user's RTP is a Monday evening commute.

In the example of FIGS. 4-7, only a single recommendation is made to the user for the sake of simplicity. However, it will be recognized that in practice, the system 200 may make multiple recommendations to the user. Furthermore, while the purchase recommendations described in the example of FIGS. 4-7 are restaurant recommendations, it will be appreciated that the purchase recommendations may be for specific meals. When the purchase recommendations are for specific meals, the table 600 may list individual meals offered by each food vendor instead of listing the vendors themselves as shown in the example. Alternatively, a secondary table may be maintained by the system 200 wherein each food vendor in the table 600 is associated with a number of meals, and more detailed information on such meals is maintained in the secondary table.

Figure 9:
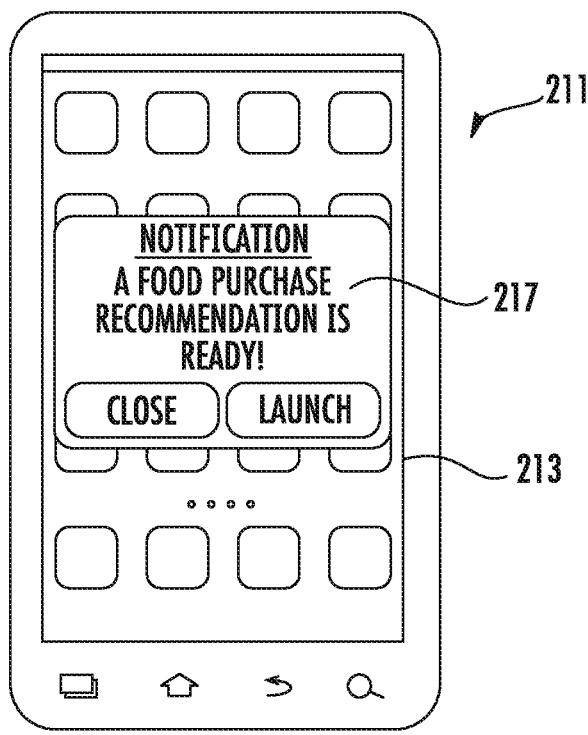
FIG. 9 is a front view of an exemplary GPS-enabled device in the form of a smart phone with a notification that a food purchase recommendation is ready for the user.

The recommendation made by the system 200 is typically provided on a display screen such as the screen of the user's smart phone or other GPS-enabled device 210. FIG. 9 shows an exemplary notification provided as a pop-up box 217 on the screen 213 of a smart phone 211 that a food purchase recommendation is ready for the user to view. The user may choose to close the notification by selecting the "close" option, or choose to see the food purchase recommendation by choosing the "launch" option. The pop-up box 217 may be generated automatically by the activity tracking system 200 depending on a determination that the user is traversing, or is in position to begin traversing, a routine travel path as previously determined by the system 200. Whether food purchase recommendations and associated notifications are provided automatically (as shown in FIG. 9), or only upon request of the user, may be a configurable setting in the user's profile.

Figure 10:
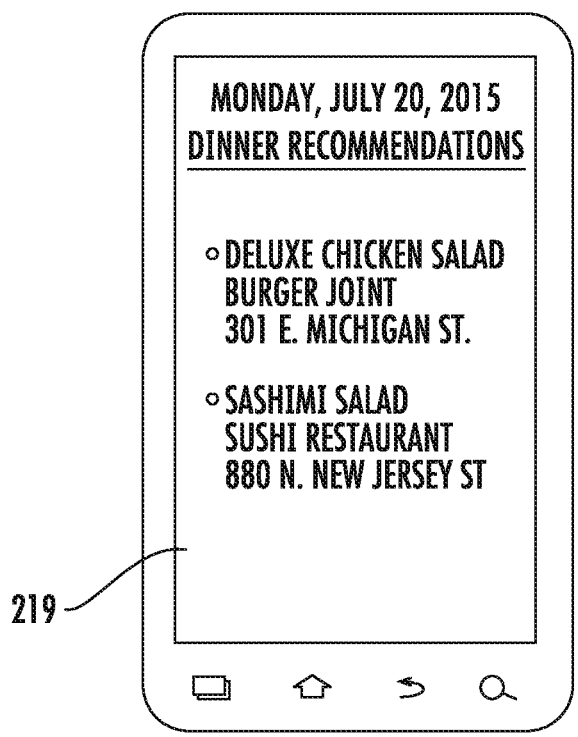
FIG. 10 is a front view of the smart phone of FIG. 9 showing a food purchase recommendation to the user.

FIG. 10 shows a food purchase recommendation on a recommendation page 219 of the user's smartphone 211. The food purchase recommendation page may be provided by the user selecting the "launch" option from the pop-up box 217 of FIG. 9, or by the user manually launching an app for the activity tracking system 200 on the smartphone 211, and then requesting a food purchase recommendation. The app associated with the activity tracking system is generally a set of instructions that is downloaded to the user's smartphone or other electronic device from the network site 231. The app facilitates data transfer between the smartphone 211 or other electronic device and the server 230, and provides the user with an interface for the activity tracking system. Data processing may occur locally within the smartphone 211 or remotely at the server 230 for the activity tracking system.

In the example of FIG. 10, the user is presented with two different dinner recommendations based on the user's RTP associated with the current time (i.e., Monday evening) and location. In this case, the food purchase recommendations include a "Deluxe Chicken Sandwich" from the Burger Joint located along or near the RTP, or a "Sashimi Salad" from the Sushi Restaurant also located along or near the RTP. If the user is interested in either of these food purchase recommendations, the user may select the food purchase recommendation to obtain additional information about the recommended food purchase. For example, if the user selects the "Deluxe Chicken Sandwich" recommendation, another page may be presented to the user that shows nutritional information (calories, carbohydrates, fat, sodium, sugar, etc.) for the recommended food purchase.

As noted above, in at least one embodiment, a food purchase recommendation may be provided automatically prior to the user beginning to traverse the RTP. For example, if the Monday evening commute typically occurs between 5 pm and 6 pm, a notice may be automatically sent to the user's smart phone between 4 pm and 5 pm recommending that the user purchase a low-glycemic meal at Grocer $G_1$. As another example, the app may provide recommendations for meals well in advance of user beginning to traverse the RTP. For example, purchase recommendations for the week, including approximate times for the user to make such purchases, could all be made days in advance based on the known RTPs of the user (e.g., a purchase recommendation for 6 pm Thursday evening could be provided by the system on Sunday morning).

In at least one alternative embodiment, purchase recommendations are only forwarded to the user when the user requests a purchase recommendation. In this embodiment, a user who is interested in purchasing a meal may ask the system 200 to make a meal recommendation at any time. The system 200 may then make a recommendation to the user based on a number of factors including known RTPs, current time, current location, and the general and specific dietary guidelines. In many situations, the recommendation will be based on a RTP that the system anticipates the user will travel in the near future (i.e., an "anticipated future travel path"). For example, if the requested recommendation is near an evening commute, the system will make a recommendation based on that RTP. However, in situations where the system does not detect that the user is about to travel on a known RTP (e.g., based on the time of day or user's current location), the recommendation to the user may be based only on the user's current location.

In at least one embodiment, the user may input specific dietary preferences prior to making a request for a food purchase recommendation. For example, imagine a diabetic user who is about to leave work and is interested in eating Chinese food for dinner. This user has already input dietary guidelines that require recommended meals to be "low glycemic." However, in addition to these general dietary guidelines, more specific dietary guidelines in the form of dietary preferences may be provided. These dietary preferences indicate specific types of meals that the user is interested in eating based on current food cravings and desires. Therefore, in this example, prior to the user requesting a food purchase recommendation from the system, the user would also indicate that he or she is interested in eating Chinese food for dinner. The system then proceeds to determine a recommendation based on the general dietary guidelines for the user and the current food preferences for the user. The resulting food purchase recommendation would be for a low-glycemic Chinese meal that is on the users upcoming RTP.

Example RTPs and Purchase Recommendations for a User

Figure 8:
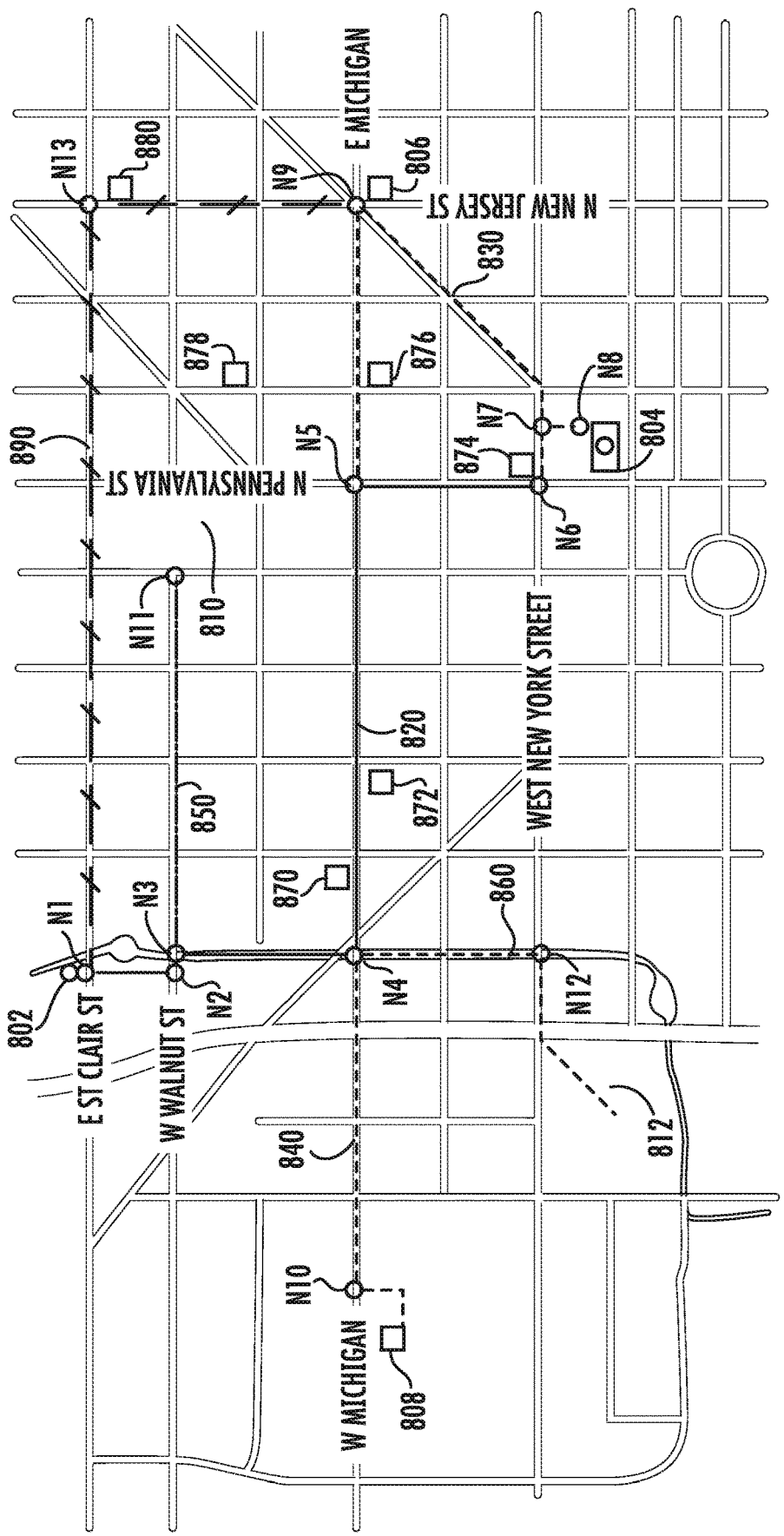
FIG. 8 is an exemplary map illustrating a number of routine travel paths for a user and food vendors associated with such routine travel paths.

With reference now to FIG. 8, an exemplary map 800 is shown including several exemplary routine travel paths (RTPs) of a user. In this example, the routine travel paths taken by the user occur along twelve different nodes labeled on the map as nodes N1-N12. In this example, the user lives in an apartment 802 near node N1. The user works at an office 804 near node N8. The user works out at a gym 806 near node N9. The user attends night classes at a university 808 near node N10. The user plays soccer in a field 810 near node N11. The user walks his dog in a park 812 near node N12.

The activity tracking system 200 has identified a number of routine travel paths of the user over a period of time. These RTPs include a typical commute path 820, a gym path 830, a Wednesday school path 840, a Saturday soccer path 850, and a Sunday walk path 860.

The typical commute path 820 (illustrated by the solid line path) extends across nodes N1-N7. This path 820 takes the user from his apartment 802 to the office 804 in the mornings. In the reverse direction (i.e., from node N7-N1), this same path 820 takes the user from the office 804 back to the apartment 802 on most evenings. The activity tracking system has determined that this is a routine travel path for the user between 8 am and 9 am Monday through Friday, and between 5 pm and 6 pm Monday, Wednesday and Friday.

While the typical commute path 820 takes the user from the office 804 to the apartment 802 across nodes N7-N1 (and the associated edges) on many evenings (e.g., evening commutes on Monday, Wednesday and Friday), on other evenings the user takes other routes home. For example, the activity tracking system 200 has determined that on Tuesday and Thursday evenings between 5 pm and 7 pm, the user's routine travel path includes a visit to the gym 806 after work.

On these days, the user's alternative evening commute path 830 passes through node N7 on the way to the gym 806, and then through nodes N9, N5, N4, N3, N2 and N1 from the gym 806 to the apartment 802. Edge (N7, N9) and edge (N9, N5) are illustrated on this alternative evening commute path 830 with dotted lines, with the remaining edges in solid lines (i.e., Edge (N5, N4), Edge (N4, N3), Edge (N3, N2), and Edge (N2, N1).

On Wednesday evenings, the activity tracking system 200 has determined that the user's routine travel path between 6 pm and 7 pm takes the user to the local university 808 where he attends a class. On these evenings, the user takes the typical evening commute path 820 to his apartment and then takes the Wednesday school path 840 (which includes nodes N1, N2, N3, N4, and N10) to the university. Thereafter, between 9 pm and 10 pm, the user returns home on the Wednesday school path 840.

The activity tracking system 200 has further determined that the user's routine travel path on Saturday between 9 am and 10 am takes the user to the soccer field 810. On these mornings, the user takes the Saturday soccer path 850 (which includes nodes N1, N2, N3 and N11) to the soccer field 810. After playing soccer, the user returns back to the apartment 802 in the opposite direction on the Saturday soccer path (through nodes N11, N3, N2 and N1).

The activity tracking system 200 has further determined that the user's routine travel path on Sunday between 11 am and 12 pm takes the user to the park 812. On these mornings, the user takes the Sunday walk path 850 (which includes nodes N1, N2, N3, N4 and N12) to the park 812 where the user walks his dog. After visiting the park 812, the user returns back to the apartment 802 in the opposite direction on the Sunday walk path (through nodes N12, N4, N3, N2 and N1).

A number of food vendors are known by the system in the vicinity of the RTPs of the user. These food vendors include a burger joint 870, a salad shop 872, a pasta establishment 874, a pizza place 876, a sandwich shop 878, and a sushi restaurant 880. The system 200 also stores dietary information for each of the menu items for each food vendor.

In addition to food RTP information and food vendor information, user profile information is also stored by the system 200. The user profile information includes general dietary guidelines for the user (e.g., low-sodium, low-glycemic, gluten-free, etc.). In addition to general dietary guidelines the system is also equipped to record temporary preferences for the user (e.g., a particular type of food the user is interested in eating at the time). These temporary preferences may be stored by the system 200 as additional dietary guidelines that are only used for a single analysis to make food purchase recommendations.

With the foregoing information, including RTPs, dietary guidelines, and food vendor information, the system 200 is equipped to make food purchase recommendations. For example, on a Tuesday evening at 5 pm (or about the time the user begins his or her journey along the alternative evening commute path 830, the system 200 may send the user a food purchase recommendation for a location along the RTP (or within a predetermined distance from the RTP). As noted previously, this food purchase recommendation may occur automatically, without a request from the user, or may be presented to the user when the user enters the system app and requests a food purchase recommendation. In at least one embodiment wherein the food purchase recommendation occurs automatically, the food purchase recommendation is not made until the system 200 actually determines that the user is on the routine travel path (e.g., the alternative evening commute path 830). In this embodiment, the user's GPS-enabled device 210 provides the user's location and the system processes the GPS data in order to determine that the user has started on his or her RTP. In another alternative embodiment, once a number of RTPs are determined for a user, the system 200 may determine that the user is travelling along an RTP regardless of the time or day of the movement, and make automatic food purchase recommendations based upon movement along an RTP.

With continued reference to FIG. 8, the food purchase recommendation provided by the system 200 may be based on any of a limited number of food vendors associated with the RTP. The food vendors associated with an RTP will typically include food vendors located along the RTP (i.e., food vendors with addresses that fall along the street segments that comprise the RTP), as well as other food vendors within a predetermined distance of the RTP. For example, in the case of the alternative evening commute path 830, the food vendors along the RTP include the burger joint 870, the salad shop 872, and the pizza place 876. Additionally, if the system 200 is configured such that food vendors within a first relatively short predetermined distance of the RTP (e.g., 200 yards) are also included as possible food vendors, the food vendors associated with the alternative evening commute path 830 may also include the pasta establishment 874 and the sandwich shop 878. Similarly, if the system 200 is configured such that food vendors within a greater predetermined distance of the RTP (e.g., 500 yards) are also included as possible food vendors, the food vendors associated with the alternative evening commute path 830 may also include the and a sushi restaurant 880.

In the example of FIG. 8, the user has started along the alternative evening commute path 830 toward the gym, and based on the system configurations, including the user's own defined food preferences within the system 200, the system 200 provides the user with two food recommendations: (1) an ahi tuna salad from the salad shop 872, or (2) a sashimi dish from the sushi restaurant 880. Following the user's time at the gym 806, the user decides to visit the sushi restaurant 880. After the user selects this food recommendation, the GPS-enabled device 210 may be used to route the user's course to the sushi restaurant 880 and then home 802. In the example of FIG. 8, the route the user takes to the sushi restaurant 880 and home 802 is show by the x-dashed line 890. As can be seen in FIG. 8, this line 890 is not along an RTP. However, it will be recognized that, depending on the location of the food vendor associated with the selected food recommendation, the user's return path may indeed be along one of the defined RTPs.

Recommendations Based on User Goals and Location

Figure 11:
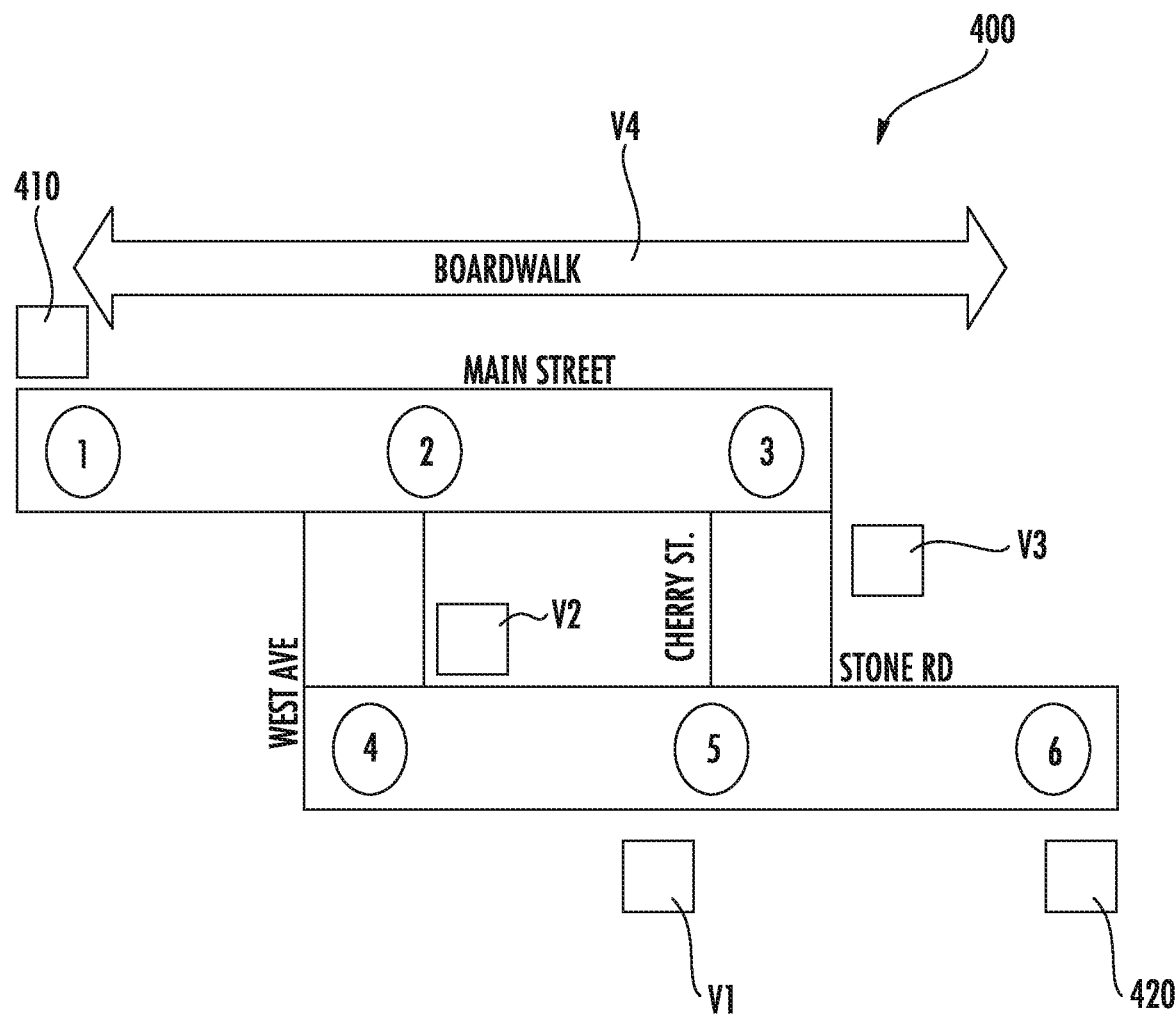
FIG. 11 shows the exemplary map of FIG. 4 associated with a routine travel path of the user with additional venues provided on the map.

With reference now to FIGS. 11 and 12, in at least one exemplary embodiment, the above described activity tracking system 200 is further configured to provide recommendations to a user based on user goals as well as the geographic location of the user. FIG. 11 shows the same street network 400 as that shown in FIG. 4 with several additional venues $V_1$-$V_4$ associated with the street network 400. As noted previously, a graph G defining the example street network may be created as a list of ordered pairs of nodes, with each ordered pair of nodes describes an edge (i.e., a connection or path between nodes). Each of the venues $V_1$-$V_4$ are associated with one or more of the edges.

In the example of FIG. 11 venue $V_1$ is a facility providing spin classes. The venue $V_1$ is located along Stone Road between nodes 4 and 5, and is therefore associated with edge E6 (nodes 4,5) on the graph. Venue $V_2$ is a gym that includes weights, treadmills, and various other machines. The venue $V_2$ is located at the corner of Stone Road and West Avenue, and is therefore associated with edges E6 (nodes 4,5) and E3 (nodes 2,4) on the graph. Venue $V_3$ is a publicly available running track at a local high school. The venue $V_3$ is located along Cherry Street between nodes 3 and 5, and is therefore associated with edge E4 (nodes 3,5) on the graph. Venue $V_4$ is a city boardwalk where a number of business establishments are located. The venue $V_4$ is located along Main Street between nodes 1 and 3, and is therefore associated with edges E1 (nodes 1,2) and E2 (nodes 2, 3) on the graph.

As noted previously, the activity tracking system 200 stores venue data associated with each of the venues $V_1$-$V_4$. In at least one embodiment, the venue data includes a record for each venue in the data store 240. The record for each venue includes an identification string, a type of venue, and an identification of whether any of various goal-related activities may be conducted at each venue. Exemplary venue data is shown in the table 900 of FIG. 12. The venue data includes a plurality of records 922, 924, 926 and 928, with each record associated with a different venue. Each record includes a number of attributes such as an identification string 902 that represents a name for the venue, a venue type 904, a venue location 906, and goals associated with the venue (e.g., cardio 910, weight 912, muscle 914 and relax 916).

As shown in FIG. 12, the venue $V_1$ is a spin class. Participants in these spin classes experience high intensity workouts, and thus venue $V_1$ is associated with cardio and weight loss goals. Venue $V_2$ is a gym where participants are free to use any of the weights, weight machines, treadmills, elliptical machines or other gym machines. The gym also provides various classes such as yoga and Pilates classes. Therefore, venue $V_2$ is associated with a number of different goals including cardio, weight loss, body building, and relaxation goals. Venue $V_3$ is a track where users may run or walk. Accordingly, venue $V_3$ is associated with cardio and weight loss goals. Venue $V_4$ is a boardwalk that is typically crowded and has some use restrictions (e.g., bikes prohibited), making it difficult for the boardwalk to be used for high intensity training such as running or biking. However, the boardwalk is ideal for walking and is therefore associated with weight loss and relaxation goals. While four exemplary venues and four exemplary goals associated with such venues are described above, it will be recognized that numerous additional venues are possible, each of which may be associated with any number of additional goals. For example, a spa may be associated with relaxation and body treatment goals. As another example, a golf course may be associated with weight loss and golf training goals. As yet another example, a dance studio may be associated with cardio and body toning goals. Accordingly, it will be recognized that the lifestyle data 247 in the data store 240 is not limited to the exemplary venue data and exemplary goal data described herein.

The lifestyle data 247, including both the venue data and the goal data may be used in combination with the routine travel paths and/or current geo-location to make lifestyle recommendations (either automatically or upon request of the user). This may be accomplished in a manner similar to that described above with reference to FIGS. 6-10 in association with food purchase recommendations. Recall that in FIGS. 6-10 the system 200 used dietary choices data 246, including both food vendor data and user diet data, in combination with the routine travel paths and/or current geo-location of the user to make food purchase recommendations. Similarly, in another embodiment, the system 200 uses the lifestyle data, including both venue data and goal data, in combination with routing travel paths and/or current geo-location of the user to make lifestyle recommendations. The term "lifestyle recommendation" as used herein refers to any of various recommended purchases of goods or services, recommended participation in exercises or activities, or recommended visits to any of various venues that are deemed to be associated with the goal data of a user. Accordingly, lifestyle recommendations may be directed to health and fitness of the user, the user's diet, philosophies adopted by the user, or any of various other lifestyle decisions associated with the user.

As an example of a lifestyle recommendation that may be provided by the system 200, consider a user who requests a lifestyle recommendation from the system 200 prior to leaving work on a Monday evening. Assume that goal data is associated with the user indicating that the user has a goal of performing a cardio workout on Monday, Tuesday and Thursday evenings. Also assume that the user has the same Monday evening commute or RTP discussed previously with reference to FIG. 4 (i.e., the RTP including Edge1 (1,2), Edge2 (2,3), Edge4 (3,5), and Edge5 (5,6)). With this RTP and the lifestyle data 247 (including both venue data and user goal data), the activity tracking system 200 may then identify various cardio exercises or workouts available to the user within proximity of his current geo-location or within proximity of the edges of his Monday evening RTP. Based on the venue data shown in FIG. 12, the system 200 may generate a number of recommendations for a Monday evening cardio workout for the user. For example, the system 200 may recommend that the user participates in a spin class at venue $V_1$, uses a treadmill or other cardio machine at the gym of venue $V_2$, or goes for a run at the track at venue $V_3$, as each of these venues will allow the user to fulfill the cardio workout goal for Monday evening. After generating one or more recommendations for the user, the recommendations are sent to the user for viewing on his or her geo-position device or other display device that may or may not be a geo-position device (e.g., a personal computer or a laptop computer).

Figure 13:
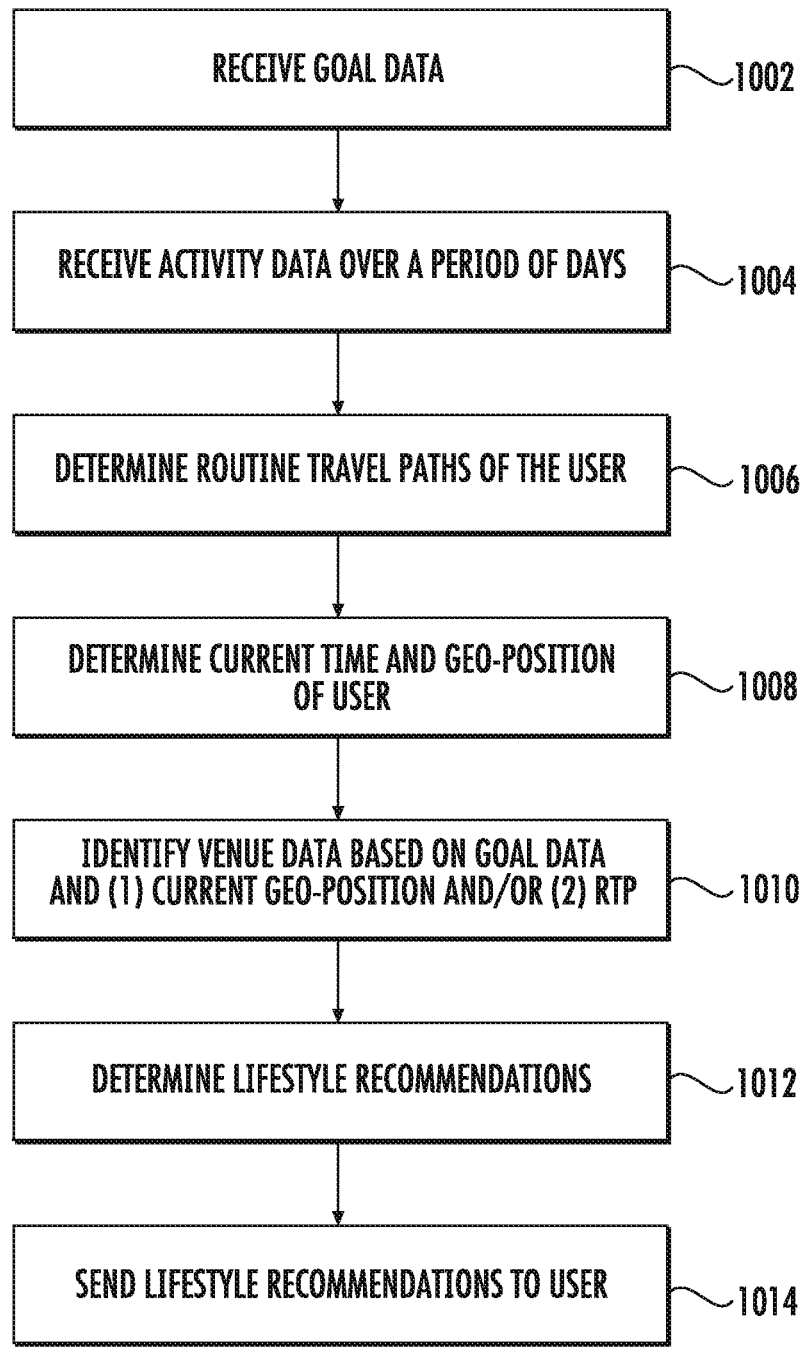
FIG. 13 is a flowchart of a method of making recommendations for a user of an activity tracking system based on geo-position data for the user and user goals.

With reference now to FIG. 13, an exemplary method 100 for providing recommendations, and particularly lifestyle recommendations based on goal data is shown. The method begins by receiving goal data from a user of the activity tracking system, as shown in step 1002 of FIG. 13. In addition to receiving goal data, the activity tracking system 200 is configured to monitor and record the activity of the user based on activity monitoring devices, such as GPS-enabled devices worn or carried by the user. Thus, as shown in step 1004, the method further includes receiving activity data from the user over a period of days, such as several weeks or months. After receiving the activity data from the user for this period of time, the method includes determining a number of routine travel paths for the user, as noted in step 1006 of FIG. 13. Next, at step 1008 a current time and geo-position data for the user are determined. The current time and geo-position data are used to provide recommendations to the user. In order to accomplish this, the method continues with step 1010, wherein venue data is identified based at least in part on the goal data and/or one or more of (1) the current time and geo-position of the user, and (2) the routine travel paths for the user. Thereafter, in step 1012, lifestyle recommendations for the user are determined and assembled, the lifestyle recommendations are based at least in part on the goal data associated with the user. These lifestyle recommendations are then sent to the user in step 1014. Any of various systems and arrangements may be used to accomplish the method 1000, including the activity tracking system 200 described herein.

Recommendations Based on Multiple User Goals and Location

In each of the above-described embodiments, the activity tracking system 200 is configured to provide recommendations to a user based on the geo-position data and goal data associated with a single user. However, in at least one exemplary embodiment, the above described activity tracking system 200 is further configured to provide recommendations to a user based on multiple user goals as well as the geo-position data for multiple users. In these embodiments, the user may specifically request that the recommendation also take into account another user and determine the recommendation based on the goal data and geo-position of both users. For example, consider the user described above with reference to FIGS. 11 and 12 who requests a lifestyle recommendation from the system 200 prior to leaving work on a Monday evening. Also consider that the user requests the lifestyle recommendation to include a friend (who is also an account holder or additional user of the activity tracking system 200). When the user requests the lifestyle recommendation, the activity tracking system will consider the goal data and geo-position of both individuals when determining the recommendation, thus resulting in a lifestyle recommendation that will serve the goals of both users. Accordingly, if the friend has a Monday evening RTP that extends along Main Street as shown in FIG. 11 (including Edge1(1,2) and Edge2(2,3)), and if the friend is associated with "lose weight" goal data, the system 200 may recommend that the user and the friend take a walk along the Boardwalk ($V_4$ in FIG. 11). This recommendation would allow both users to work toward a "lose weight" goal (but would not facilitate the user's "cardio" goal.). Alternatively, the system 200 may provide a lifestyle recommendation that both users visit the track ($V_3$ in FIG. 11) and run. This would allow the user to meet his or her "cardio" goal and the friend to meet his or her "lose weight" goal for the evening. After the recommendation is determined, the recommendation is sent to both the user requesting the recommendation as well as the friend on their respective display devices. While the foregoing is but one example of a recommendation that may be made based on multiple users, it will be appreciated that numerous different dietary choices recommendations and lifestyle recommendations may be made based on the goals and geo-position data for multiple users.

The foregoing methods and arrangements may be accomplished with the assistance of a computer program stored in the memory and executed by the processor of the system server 230. The above described system and method solves a technological problem common in industry practice related to effective and efficient presentation of food items and other data to a user. Moreover, the above-described system and method improves the functioning of the computer/device by causing food data such as menu items, nutritional data, etc. to be easily presented to a user in an activity tracking system, while also allowing the user to manipulate the food data or otherwise make use of the food data in the manner that he or she sees fit.

In the foregoing description, various operations may be described as multiple discrete actions or operations in turn, in a manner that may be helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). Additionally, the phrases "in an embodiment," "in at least one embodiment," or "in embodiments," may each refer to one or more of the same or different embodiments. Furthermore, the terms "comprising," "including," "having," and the like, as used with respect to embodiments of the present disclosure, are synonymous.

The foregoing detailed description of one or more exemplary embodiments of the activity tracking system and associated devices has been presented herein by way of example only and not limitation. As noted previously, while food purchase recommendations have been used in the exemplary embodiments described herein, it will be recognized that the system may be configured to make any of various types of other purchase recommendations. It will also be recognized that there are advantages to certain individual features and functions described herein that may be obtained without incorporating other features and functions described herein. Moreover, it will be recognized that various alternatives, modifications, variations, or improvements of the above-disclosed exemplary embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

What is claimed is:

1. A method to provide one or more recommendations to a user of an activity tracking system, the method comprising:
   receiving activity data relating to activity of the user over a period of days at a global positioning system (GPS)-enabled device configured to receive GPS data;
   determining, at the GPS-enabled device, a routine travel path of the user based on the activity data, wherein the routine travel path is defined by a plurality of nodes and edges of a street network which the user repeatedly traversed between a first location and a second location over a number of days during different travel events, and wherein the routine travel path is associated with a period of time during a week;
   selecting the routine travel path, at the GPS-enabled device, based on a current location of the user being the first location or the second location and a current time being within the period of time;
   identifying a plurality of vendors located within a threshold distance of the edges defined along an entirety of the routine travel path;
   determining, at the GPS-enabled device, at least one recommendation for the user based at least in part on the identified vendors and an anticipated future travel path for the user that is based on the same as the selected routine travel path; and
   displaying the at least one recommendation to the user on a display of the GPS-enabled device, wherein the at least one recommendation comprises a purchase recommendation from one of the identified plurality of vendors.

2. The method of claim 1, further comprising:
receiving a plurality of dietary guidelines associated to the user; and
identifying at least one food vendor based at least in part on (i) a proximity of the at least one food vendor to the at least one routine travel path, and/or (ii) the at least one food vendor offering one or more food items that meet the plurality of dietary guidelines associated to the user.

3. The method of claim 2, wherein the plurality of dietary guidelines comprise dietary preferences or nutritional goals.

4. The method of claim 3, wherein the nutritional goals are caloric limitations.

5. The method of claim 1, wherein the at least one routine travel path is associated with a day of a week and/or a time of day.

6. The method of claim 1, wherein the at least one recommendation further comprises an activity or lifestyle recommendation which is based at least in part on one or more goals associated with the user.

7. The method of claim 6, further comprising:
receiving a plurality of activity or lifestyle goals associated to the user; and
identifying at least one venue based at least in part on (i) a proximity of the at least one venue to the at least one routine travel path, and/or (ii) the at least one venue offering an activity or lifestyle option that meets plurality of activity or lifestyle goals associated to the user.

8. An activity tracking system comprising:
a GPS-enabled geo-position device configured to:
obtain activity data relating to a user, the activity data including GPS data;
determine one or more routine travel paths of the user based at least in part on the activity data, wherein the one or more routine travel paths are defined by a plurality of nodes and edges of a street network which the user repeatedly traversed between a first location and a second location during different travel events occurring within a same period of time over a number of days;
determine an anticipated future travel path for the user based on a current time and current geo-position of the user in relation to the determined one or more routine travel paths, the anticipated future travel path the same as at least one of the one or more routine travel paths of the user; and
identify one or more recommended items or venues based at least in part on the determined anticipated future travel path of the user, said item for sale or venue being within a threshold distance of the edges defined along an entirety of the anticipated future travel path; and
a display device in communication with the geo-position device and comprising at least a display screen configured to display the identified one or more recommended items or venues to the user at the current time.

9. The activity tracking system of claim 8, wherein identified one or more recommended items or venues comprises a recommended food item for purchase and the activity tracking system is further configured to:
receive dietary guidelines associated to the user, and
identify at least one food vendor based at least in part on (i) a proximity of the at least one food vendor to the one or more routine travel paths, and (ii) the at least one food vendor offering food items that meet the dietary guidelines associated to the user.

10. The activity tracking system of claim 8, wherein identified one or more recommended items or venues comprises a recommended venue and the activity tracking system is further configured to:
receive a plurality of activity or lifestyle goals associated to the user; and
identify at least one venue based at least in part on (i) a proximity of the at least one venue to the one or more routine travel paths, and/or (ii) the at least one venue offering an activity or lifestyle option that meets plurality of activity or lifestyle goals associated to the user.

11. A method of making recommendations for a user of an activity tracking system, the method comprising:
associating goal data with the user;
receiving activity data for the user over a period of days from a GPS-enabled smartphone associated with the user, the activity data including GPS data collected by the GPS-enabled smartphone;
determine, using the GPS-enabled smartphone, a plurality of routine travel paths for the user based on the activity data from the GPS-enabled smartphone, at least one of the routine travel paths defined by a plurality of nodes and edges of a street network which the user repeatedly traversed between a first location and a second location over a number of days during different travel events, and wherein the routine travel path is associated with a period of time during a week;
detecting, with the GPS-enabled smartphone, a current location of the user and selecting said at least one routine travel path based on the current location of the user being the first location or the second location and a current time being within the period of time;
identifying a plurality of vendors located within a threshold distance of the edges along an entirety of said at least one routine travel path between the first location and the second location;
determining a recommendation for the user for display on the GPS-enabled smartphone, the recommendation based at least in part on an anticipated future travel path for the user that is the same as said at least one routine travel path for the user, the goal data associated with the user, and at least one of the identified vendors;
displaying the recommendation on a display of the GPS-enabled smartphone, the recommendation including said at least one of the identified vendors;
receiving an order to purchase an item from said at least one of the identified vendors via the GPS-enabled smartphone; and
transmitting said order via the GPS-enabled smartphone.

12. The method of claim 11, wherein the goal data includes at least one health and fitness goal.

13. The method of claim 11, wherein the goal data includes dietary choices data.

14. The method of claim 11, wherein the goal data includes lifestyle data.

15. The method of claim 11, further comprising receiving goal data from the user prior to associating the goal data with the user.

16. The method of claim 11, wherein the user is a first user and the GPS-enabled smartphone is a first GPS-enabled smartphone, and the method further comprises:
associating goal data with a second user; and
obtaining geo-position data for the second user from a second GPS-enabled smartphone;
wherein the recommendation is further based at least in part on the GPS data for the second user and the goal data associated with the second user.

17. The method of claim 16, further comprising sending the recommendation to the first user and the second user.

\* \* \* \* \*